United States Patent
MacFarlane et al.

(10) Patent No.: US 9,957,383 B2
(45) Date of Patent: May 1, 2018

(54) BRUSH BLOCK COPOLYMER INFRARED 1-D PHOTONIC CRYSTALS USING LINEAR POLYMER ADDITIVES

(71) Applicant: CALIFORNIA INSTITUTE OF TECHNOLOGY, Pasadena, CA (US)

(72) Inventors: Robert J. MacFarlane, Pasadena, CA (US); Robert H. Grubbs, South Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 399 days.

(21) Appl. No.: 14/850,178

(22) Filed: Sep. 10, 2015

(65) Prior Publication Data

US 2016/0068669 A1 Mar. 10, 2016

Related U.S. Application Data

(60) Provisional application No. 62/048,727, filed on Sep. 10, 2014.

(51) Int. Cl.
| | | |
|---|---|---|
| *C08L 25/06* | (2006.01) | |
| *C09D 125/06* | (2006.01) | |
| *C08L 53/00* | (2006.01) | |
| *C09D 153/00* | (2006.01) | |
| *C08G 81/02* | (2006.01) | |
| *C09D 5/00* | (2006.01) | |
| *C09D 5/33* | (2006.01) | |
| *C08F 8/00* | (2006.01) | |

(52) U.S. Cl.
CPC ............... *C08L 25/06* (2013.01); *C08F 8/00* (2013.01); *C08G 81/024* (2013.01); *C08L 53/00* (2013.01); *C09D 5/004* (2013.01); *C09D 125/06* (2013.01); *C09D 153/00* (2013.01); *C08G 2261/136* (2013.01); *C08G 2261/3324* (2013.01); *C08G 2261/35* (2013.01); *C08G 2261/418* (2013.01); *C08G 2261/90* (2013.01)

(58) Field of Classification Search
CPC ....... C08L 25/06; C08L 53/00; C09D 125/06; C09D 153/00; C09D 5/004; C09G 81/024; C09G 2261/3324; C08F 8/00
USPC ........................................................ 524/505
See application file for complete search history.

(56) References Cited

U.S. PATENT DOCUMENTS 8,822,615 B1 * 9/2014 Trefonas .............. C09D 153/00
526/279
9,453,943 B2 * 9/2016 Miyake .................. G02B 1/005

OTHER PUBLICATIONS

Macfarlane et al. "Improving Brush Polymer Infrared One-Dimensional Photonic Crystals via Linear Polymer Additives", J. Am. Chem. Soc. 2014, 136, 17374-17377.*
Miyake et al. "Synthesis of Isocyanate-Based Brush Block Copolymers and Their Rapid Self-Assembly to Infrared-Reflecting Photonic Crystals", J. Am. Chem. Soc. 2012, 134, 14249-14254.*
Xia et al. "Efficient Synthesis of Narrowly Dispersed Brush Polymers via Living Ring-Opening Metathesis Polymerization of Macromonomers", Macromolecules, 2009, 42, 3761-3766.*
Colmenero, et al., "Experimental Evidence by Neutron Scattering of a Crossover from Gaussian to Non-Gaussian Behavior in the a Relaxation of Polyisoprene", Phys. Rev. E., May 2003, vol. 67, 16 pgs.

(Continued)

*Primary Examiner* — Michael M Bernshteyn
(74) *Attorney, Agent, or Firm* — Baker & Hostetler LLP

(57) ABSTRACT

The present invention is directed to brush block copolymer compositions comprising first and second homopolymers or random copolymers whose presence provides access to photonic bandgaps in the infrared frequency range, their use in this capacity, and methods of making the same. The specific parameters associated with these compositions are described within the specification.

23 Claims, 30 Drawing Sheets

(56) References Cited

OTHER PUBLICATIONS

Joannopoulos, et al., "Photonic Crystals Molding the Flow of Light", Princeton University Press, 2008, Second Edition, 305 pgs.

Maher, et al., "Interfacial Design for Block Copolymer Thin Films", Chem. Mater., Jan. 2014, 26, 1471-1479.

Sveinbjornsson, et al., "Rapid Self-Assembly of Brush Block Copolymers to Photonic Crystals", Proc. Natl. Acad., Jul. 2012, 109(36), 14332-14336.

Wallace, et al., "Preparation of 1,3,5-Tris(aminomethyl)-2,4,6-triethylbenzene from Two Versatile 1,3,5-Tri(halosubstituted) Derivatives", Synthesis, 2005,12, 2080-2083.

Wang et al., "Hierarchically Ordered Microstructures Self-Assembled from Comb-Coil Block Copolymers", Langmuir, Mar. 3, 2009, 25(8), 4735-4742.

Xia, et al., "Efficient Synthesis of Narrowly Dispersed Brush Polymers Via Living Ring-Opening Metathesis Polymerization of Macromonomers", Macromolecules, 2009, 42, 3761-3766.

Zalusky, et al., "Ordered Nanoporous Polymers from Polystyrene-Polylactide Block Copolymers", J. Am. Chem. Soc., 2002, 124(43), 12761-73.

Yekaterina Rokhlenko, Manesh Gopinadhan, Chinedum O. Osuji, Kai Zhang, Corey S. O'Hern, Steven R. Larson, Padma Gopalan, Pawel W. Majewski, and Kevin G. Yager Phys. Rev. Lett. 115, 258302 (2015).

V. Olszowka, M. Hund, V. Kuntermann, S. Scherdel, L. Tsarkova, and A. Boker, ACS Nano 3, 1091 (2009).

Majewski, P. W., Gopinadhan, M. and Osuji, C. O. (2012), Magnetic field alignment of block copolymers and polymer nanocomposites: Scalable microstructure control in functional soft materials. J. Polym. Sci. B Polym. Phys., 50: 2-8.

Liedel, C., Schindler, K. A., Pavan, M. J., Lewin, C., Pester, C. W., Ruppel, M., Urban, V. S., Shenhar, R. and Büker, A. (2013), Electric-Field-Induced Alignment of Block Copolymer/Nanoparticle Blends. Small, 9: 3276-3281.

\* cited by examiner

| BBCP ID | Wt% HP | λMax (nm) | $d_{Lam}$ (nm) | %Swollen | Δλ/λ |
|---|---|---|---|---|---|
| A | 0.0% | 391 | 128 | - | 0.238 |
| A | 15.0% | 413 | 134 | 5.63% | 0.262 |
| A | 30.0% | 424 | 141* | 8.44% | 0.217 |
| A | 45.0% | 459 | 156 | 17.4% | 0.229 |
| A | 55.0% | 457 | 171 | 16.9% | 0.228 |
| A | 65.0% | 528 | 188 | 35.0% | 0.199 |
| A | 67.5% | 530 | 197 | 35.5% | 0.219 |
| A | 70.0% | 513 | 191 | 31.2% | 0.390 |

| BBCP ID | Wt% HP | λMax (nm) | dL,sm (nm) | %Swollen | Δλ/λ |
|---|---|---|---|---|---|
| B | 0.0% | 442 | 143 | - | 0.231 |
| B | 15.0% | 466 | 152 | 5.43% | 0.206 |
| B | 30.0% | 499 | 164 | 12.9% | 0.204 |
| B | 45.0% | 548 | 177 | 24.0% | 0.237 |
| B | 55.0% | 586 | 194 | 32.6% | 0.215 |
| B | 65.0% | 667 | 221* | 50.9% | 0.249 |
| B | 67.5% | 685 | 227* | 55.0% | 0.301 |
| B | 70.0% | 659 | 219* | 49.1% | 0.285 |

| BBCP ID | Wt% HP | λmax (nm) | dLam (nm) | %Swollen | Δλ/λ |
|---|---|---|---|---|---|
| C | 0.0% | 512 | 170* | - | 0.199 |
| C | 15.0% | 545 | 181* | 6.45% | 0.204 |
| C | 30.0% | 583 | 195 | 13.9% | 0.202 |
| C | 45.0% | 635 | 205 | 24.0% | 0.191 |
| C | 55.0% | 676 | 222 | 32.0% | 0.204 |
| C | 65.0% | 751 | 242 | 46.7% | 0.240 |
| C | 67.5% | 759 | 251* | 48.2% | 0.258 |
| C | 70.0% | 793 | 263* | 54.9% | 0.262 |
| C | 75.0% | 874 | 290* | 70.7% | 0.414 |

| BBCP ID | Wt% HP | $\lambda_{max}$ (nm) | $d_{LAM}$ (nm) | % Swollen | $\Delta\lambda/\lambda$ |
|---|---|---|---|---|---|
| D | 0.0% | 574 | 195 | - | 0.221 |
| D | 15.0% | 611 | 203* | 6.45% | 0.239 |
| D | 30.0% | 660 | 216 | 15.0% | 0.221 |
| D | 45.0% | 717 | 230 | 24.9% | 0.250 |
| D | 55.0% | 772 | 254 | 34.5% | 0.249 |
| D | 65.0% | 872 | 270 | 51.9% | 0.275 |
| D | 67.5% | 890 | 295* | 55.1% | 0.243 |
| D | 70.0% | 925 | 307* | 61.1% | 0.259 |
| D | 72.5% | 1042 | 346* | 81.5% | 0.361 |
| D | 75.0% | 946 | 314* | 64.8% | 0.357 |

| BBCP ID | Wt% HP | λMax (nm) | d₁₀₀ (nm) | %Swollen | Δλ/λ |
|---|---|---|---|---|---|
| E | 0.0% | 695 | 227 | - | 0.322 |
| E | 15.0% | 716 | 237* | 3.0% | 0.332 |
| E | 30.0% | 768 | 250 | 10.5% | 0.326 |
| E | 45.0% | 837 | 267 | 20.4% | 0.292 |
| E | 55.0% | 913 | 284 | 31.4% | 0.278 |
| E | 65.0% | 961 | 309 | 38.3% | 0.352 |

| BBCP ID | Wt% HP | λ_Max (nm) | d_sm (nm) | % Swollen | ΔN/λ |
|---|---|---|---|---|---|
| F | 0.0% | 829 | 275* | - | 0.273 |
| F | 15.0% | 865 | 287* | 4.34% | 0.294 |
| F | 30.0% | 946 | 314* | 14.1% | 0.247 |
| F | 45.0% | 1015 | 340 | 22.6% | 0.232 |
| F | 55.0% | 1094 | 362 | 32.0% | 0.236 |
| F | 65.0% | 1188 | 391* | 42.3% | 0.224 |
| F | 70.0% | 1253 | 416* | 51.1% | 0.271 |
| F | 72.5% | 1286 | 426* | 55.1% | 0.322 |

| BBCP ID | Wt% HP | λMax (nm) | dLam (nm) | % Swollen | Δλ/λ |
|---|---|---|---|---|---|
| G | 0.0% | 921 | 305* | - | 0.363 |
| G | 15.0% | 991 | 329* | 7.60% | 0.329 |
| G | 30.0% | 1041 | 345* | 13.0% | 0.284 |
| G | 45.0% | 1130 | 374* | 22.7% | 0.258 |
| G | 55.0% | 1198 | 397* | 30.1% | 0.259 |
| G | 65.0% | 1333 | 442* | 44.7% | 0.234 |
| G | 75.0% | 1403 | 465* | 52.3% | 0.285 |

US 9,957,383 B2

BRUSH BLOCK COPOLYMER INFRARED 1-D PHOTONIC CRYSTALS USING LINEAR POLYMER ADDITIVES

CROSS REFERENCE TO RELATED APPLICATIONS

This application claims priority to U.S. Patent Application Ser. No. 62/048,727, filed Sep. 10, 2014, the contents of which are incorporated by reference herein in their entirety.

GOVERNMENT RIGHTS

This invention was made with government support under Grant No. CHE12127767 awarded by the National Science Foundation. The government has certain rights in the invention.

This invention was also made with State of California support under California Energy Commission Grant No. 57642A/13-02. The Energy Commission has certain rights to this invention.

TECHNICAL FIELD

The present disclosure relates to brush block polymers and their use in photonic applications, particularly infrared photonic applications.

BACKGROUND

Materials that can selectively control light by efficient reflection, directed propagation or enhanced confinement have numerous applications as optical elements and devices. Photonic crystals (PCs) are a class of nanostructured materials with tunable reflection due to their periodic dielectric function, which creates a photonic bandgap where there are no allowed frequencies at which light can propagate through the material. One dimensional photonic crystals are already in widespread use, in the form of thin-film optics, with applications ranging from low and high reflection coatings on lenses and mirrors to color changing paints and inks. Higher dimensional photonic crystals are useful in non-linear devices and waveguides. Such devices rely on periodic nanoscale ordering of materials that affect the motion of photons trapped within the crystals.

Self-assembly is a powerful means of generating nanometer scale ordering in materials that often possess emergent photonic, plasmonic, magnetic, or other physical phenomena as a result of nanoscale structure control. However, self-assembled materials with resonant optical properties such as photonic band gaps are often difficult to achieve, as they require structures with large periodicities that are comparable to the wavelengths of light being manipulated.

Recently, brush block copolymers (BBCPs) have shown promise as building blocks for self-assembled photonic bad gaps in the UV, visible and IR. Brush block copolymers are large molecular weight structures that rapidly self-assemble into 1-D stacks with periodicities on the order of 100s of nanometers. These stacks are 1-D photonic crystals—they reflect light of a specific set of wavelengths that is determined by the thickness of the BBCP layers in a stack. In order to make these stacks reflect infrared light, they need to have layer thicknesses on the order of >250 nm. Such BBCPs can be readily synthesized by using a highly active ruthenium metathesis catalyst to polymerize norbornene-terminated polymer macromonomers via ring-opening metathesis polymerization, generating high molecular weight (MW, up to ~6.5 MDa) polymers with relatively low dispersity (FIG. 1). Because of the steric hindrance that the macromolecule brushes impose upon the polynorbornene backbone, initial attempts were unable to produce structures that reflected these higher wavelengths, or if they did they were not very reflective and exhibited a significant amount of scattered light in the visible region of the spectrum. This is because the ordering of the BBCPs large enough to generate these stacks was very poor, due to the polydispersity in BBCP length and the rigidity of the BBCPs preventing the stacks from forming properly. In brief, the BBCPs act as rigid rods—if not all rods are the same length, it is difficult for them to properly pack without gaps in the assembled stacks.

Major challenges remain in the development of BBCP-based photonic bad gap materials, including synthesizing films that are reflective in the telecomm wavelength regime ~1200-1650 nm) without being opaque in the visible, enhancing the processability of BBCPs during and after their synthesis, and incorporating different functional groups that would enable applications such as alignment, crosslinking, or manipulation of refractive indices. Although different macromonomers have been used to attempt to address some of these challenges, the difficulty inherent to generating such high MW polymers with low dispersity requires a re-optimization of the synthesis protocol for each new type of BBCP or macromolecule brush architecture.

The present invention is directed to solving at least some of these problems.

SUMMARY

Certain embodiments of the present invention include compositions, each comprising:
(a) a brush block copolymer comprising a backbone and pendant polymer arms,
  (i) the brush block copolymer having an overall weight averaged molecular weight in a range of from about 800 kDa to about 5000 kDa, and having a polydispersity index (PDI) in a range of about 1 to about 1.2;
  (ii) the block copolymer comprising first and second block linear copolymer moieties, the first block comprising a first linear pendant polymer arm and the second block comprising a second linear pendant polymer arm, the first and second block copolymer moieties being present in a ratio of molecular weights in a range of from about 60:40 to about 40:60;
  (iii) the first and second linear pendant polymer arms each comprising different repeating monomer units, each arm independently having a degree of polymerization (DP) in a range of from about 20 to about 200 and a polydispersity index in range of from about 1 to about 1.2;
(b) a first optionally functionalized linear polymer having a weight averaged molecular weight in a range of from about 1 kDa to about 20 kD and compatible with the first pendant linear polymer arm;
(c) a second optionally functionalized linear polymer having a weight averaged molecular weight in a range of from about 1 kDa to about 20 kD and compatible with the second linear pendant polymer arm;
wherein the first and second polymers are present, with respect to each other, in a weight ratio of from about 60:40 to about 40:60; and wherein the first and second linear polymers are together present, with respect to the brush block copolymer, in a weight ratio of from about 2:98 to about 80:20.

Certain sub-embodiments are described which expand upon the chemical nature, molecular weight ranges, and polydispersity indices of the backbones, polymers, and polymer arms described herein.

The nature of the first and second polymer arms and first and second polymers are not necessarily limited, and each may independently comprise alkylene, alkenylene, amido, carbonate, ester, ether, urethane repeating units, or a combination thereof. Typically, the first and second polymer arms (and corresponding first and second polymers) are chemically dissimilar with one another, leading to the formation of lamellar structures in the brush block copolymer structure.

In some embodiments, first linear polymer contains the same repeating monomer units as present in the first pendant polymer arm. In other embodiments, the first linear polymer contains different, albeit chemically compatible repeating monomer units as present in the first pendant polymer arm (e.g., both are characterized as unfunctionalized or both are differently functionalized). In still other embodiments, the first linear polymer contains the same repeating monomer units as in the first pendant polymer arm, except that at least some of the repeating units in the first linear polymer are functionalized, whereas those in the first polymer arm are not.

Independently, in some embodiments, the second linear polymer contains the same repeating monomer units as present in the second pendant polymer arm. In other embodiments, the second linear polymer contains different, albeit chemically compatible repeating monomer units as present in the second pendant polymer arm (e.g., both are characterized as unfunctionalized or both are differently functionalized). In still other embodiments, the second linear polymer contains the same repeating monomer units as in the second pendant polymer arm, except that at least some of the repeating units in the second linear polymer are functionalized, whereas those in the second polymer are are not.

In some embodiments, the structure of the brush block copolymers, in the absence of the first and second linear polymers, exhibits a lamellar periodicity in a range of from about 10 nm to about 500 nm. In other embodiments, the structure of the brush block copolymer, in the presence of the first and second linear polymers, exhibits a lamellar periodicity in a range of from about 60 nm to about 600 nm. In still other embodiments, the compositions exhibit photonic band gaps (reflection maxima) at a wavelength in a range of from about 200nm to about 1750 nm. These compositions may also transmits at least about 30% of incident light over a series of wavelengths in the range from about 350 nm to about 600 nm.

Structures and devices are also within the scope of this invention. Such structures and devices comprising these compositions include, at least, infrared reflective coatings. Such structures include window treatments, heat reflective surfaces, waveguides, laser cavity coatings. Additional embodiments include chemochromic sensors, solar cells, and dielectric mirrors.

Additional embodiments include methods of making and post-processing the inventive compositions.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, processes, devices, and systems disclosed. In addition, the drawings are not necessarily drawn to scale. In the drawings.

DETAILED DESCRIPTION OF ILLUSTRATIVE EMBODIMENTS

Figure 1:
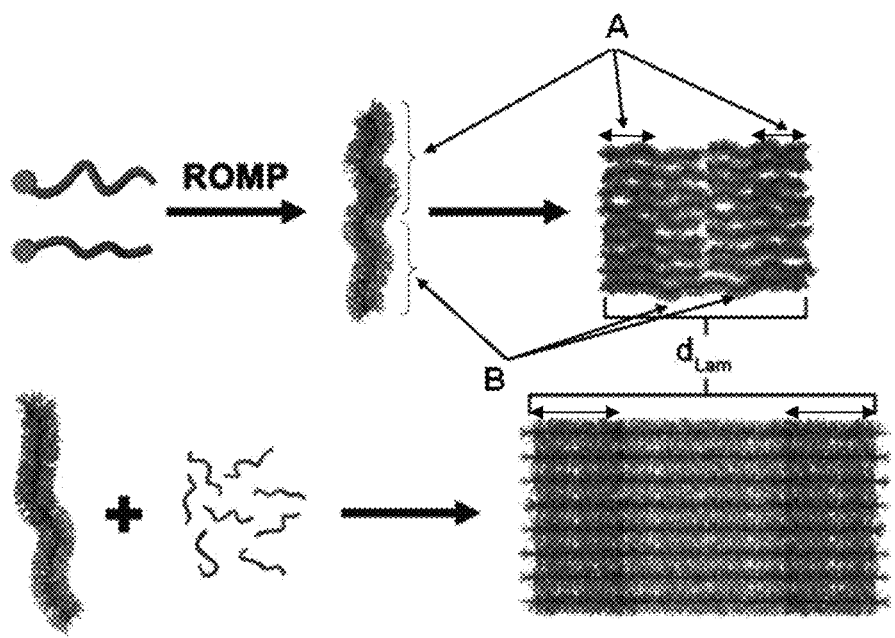
FIG. 1 is a cartoon representation of brush block copolymers generated from norbornene-terminated polystyrene (PS) and PLA macromonomers adopting a rigid, rod-like conformation that allows them to easily assemble into lamellar arrays with large periodicities. Adding small PS and PLA homopolymers swells these arrays, increasing their domain spacing.

The present invention is directed to brush block copolymers (BBCP) blended with relatively low molecular weight homopolymers or randomly functionalized copolymers, the blending providing a means to control the lamellar array periodicity between ~100-500 nm, Brush block copolymers (BBCPs) enable the rapid fabrication of self-assembled one-dimensional photonic crystals with photonic band gaps that are tunable in the UV-vis-IR, where the peak wavelength of reflection scales with the molecular weight of the BBCPs. Due to the difficulty in synthesizing very large BBCPs, the fidelity of the assembled lamellar nanostructures drastically erodes as the domains become large enough to reflect IR light, severely limiting their performance as optical filters. To overcome this challenge, short linear homopolymers can be used to swell the arrays upwards of 180% to 200% of the initial domain spacing, allowing for photonic band gaps up to about 1650-1750 nm without significant opacity in the visible, demonstrating improved ordering of the arrays. Additionally, blending BBCPs with random copolymers enables functional groups to be incorporated into the BBCP array without attaching them directly to the BBCPs. The addition of short linear polymers to the BBCP arrays thus offers a facile means of improving the self-assembly and optical properties of these materials, as well as adding a route to achieving films with greater functionality and tailorability, without the need to develop or optimize the processing conditions for each new brush polymer synthesized.

The present invention may be understood more readily by reference to the following description taken in connection with the accompanying Figures and Examples, all of which form a part of this disclosure. It is to be understood that this invention is not limited to the specific products, methods, processes, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this specification, claims, and drawings, it is recognized that the descriptions refer to compositions and processes of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Certain embodiments provide compositions, each comprising:
  (a) a brush block copolymer comprising a backbone and pendant linear polymer arms,
    (i) the brush block copolymer having an overall weight averaged molecular weight in a range of from about 800 kDa to about 5000 kDa, and having a polydispersity index (PDI) in a range of about 1 to about 1.2;
    (ii) the block copolymer comprising first and second block copolymer moieties, the first block comprising a first pendant linear polymer arm and the second block comprising a second pendant linear polymer arm, the first and second block copolymer moieties being present in a ratio of molecular weights in a range of from about 60:40 to about 40:60;
    (iii) the first and second pendant linear polymer arms each comprising different repeating monomer units, each arm independently having a degree of polymerization (DP) in a range of from about 20 to about 200 and a polydispersity index in range of from about 1 to about 1.2;
  (b) a first optionally functionalized linear polymer having a weight averaged molecular weight in a range of from about 1 kDa to about 20 kD and compatible with the first pendant polymer arm;
  (c) a second optionally functionalized linear polymer having a weight averaged molecular weight in a range of from about 1 kDa to about 20 kD and compatible with the second pendant polymer arm;
  wherein the first and second linear polymers are present, with respect to each other, in a weight ratio of from about 60:40 to about 40:60; and
  wherein the first and second linear polymers are together present, with respect to the brush block copolymer, in a weight ratio of from about 2:98 to about 80:20.

As used herein, the terms first and second polymers or first and second polymer arms refer both to homopolymers or randomly functionalized copolymers. In all cases, the polymers and polymer arms are linear, this term "linear" being understood by the skilled artisan as having minimal, or practicably no, branching.

The present invention is directed to brush block copylymers and their source of method of preparing is flexible, so as not to be specific to any particular method of making. Brush coplymers comprise a central backbone polymer, attached to which are pendant linear polymer moieties, described herein as (linear) polymer arms, which radiate from the central backbone. These are conveniently prepared by attaching a polymerizable functional group to one end of each polymer arm (this structure being referred to as a polymerizable polymer arm), and then polymerizing the polymerizable functional group to the desired total backbone length.

Any method suitable for polymerizing the respective polymerizable functional group can be used, but one convenient method of doing this is by providing using enynes, diynes, or cyclic olefins as the polymerizable functional groups, and polymerizing these by olefin metathesis. Cyclic olefins, particularly strained cyclic olefins, can then be polymerized using ring opening metathesis polymerization (ROMP). This technique is well-known to those skilled in the art.

Within this type of chemistry, the use of first-, second-, or third-generation Grubbs-type ruthenium olefin metathesis catalysts has been shown to be particular suitable for this purpose. Catalysts of the formula, $(H_2IMes)(PCy_3)(Cl)_2Ru=CHPh$ have been shown to be especially suitable, showing convenient turnovers and rates, polymer length tunability, and tolerace to various functional groups. The present invention is not necessarily limited to this particular catalysts structure, or even ruthenium-based catalysts, or even this method of preparing the brush block copolymers. When prepared this way, the resulting backbone then comprises optionally substituted alkylene, alkenylene, or both alkylene or alkenylene linkages.

In one aspect, ROMP is attractive because it allows the synthesis of polymers having very narrow polydispersities. In some embodiments, the inventive compositions comprise brush block copolymers having polydispersity indicies in a range of from about 1 to about 1.2. In preferred embodiments, the polydispersity indicies are in a range of from about 1.0 to about 1.1, from about 1.0 to about 1.08, from about 1.0 to about 1.06, from about 1.0 to about 1.4, from about 1.0 to about 1.02, or from about 1.0 to about 1.01.

For brush block coplymers prepared by ROMP, the polymerizable functional group often comprises a strained ring structure, preferably a bicyclo structure. One convenient class of such structures includes optionally substituted norbornenes or 7-oxa-bicyclo[2.2.1]hept-2-enes, though other strained bicyclic structures are also suitable. The cores of these types of groups can be shown as:

Examples of functionalized cyclic olefins include without limitation 2-hydroxymethyl-5-norbornene, 2-[(2-hydroxyethyl)carboxylate]-5-norbornene, cydecanol, 5-n-hexyl-2-norbornene, 5-n-butyl-2-norbornene, or their 7-oxa-bicyclo [2.2.1]hept-2-ene analogs. Still other cyclic olefins include dicyclopentadiene; tricyclopentadiene; dicyclohexadiene; norbornene; 5-methyl-2-norbornene; 5-ethyl-2-norbornene; 5-isobutyl-2-norbornene; 5,6-dimethyl-2-norbornene; 5-phenylnorbornene; 5-benzylnorbornene; 5-acetylnorbornene; 5-methoxycarbonylnorbornene; 5-ethoxycarbonyl-1-norbornene; 5-methyl-5-methoxy-carbonylnorbornene; 5-cyanonorbornene; 5,5,5-trimethyl-2-norbornene; cyclohexenylnorbornene; endo, exo-5,6-dimethoxynorbornene; endo, endo-5,6-dimethoxynorbornene; endo, exo-5-6-dimethoxycarbonylnorbornene; endo, endo-5,6-dimethoxycarbonylnorbornene; 2,3-dimethoxynorbornene; norbornadiene; tricycloundecene; tetracyclododecene; 8-methyltetracyclododecene; 8-ethyl-tetracyclododecene; 8-methoxycarbonyltetracyclododecene; 8-methyl-8-tetracyclo-dodecene; 8-cyanotetracyclododecene; pentacyclopentadecene; pentacyclohexadecene; higher order oligomers of cyclopentadiene such as cyclopentadiene tetramer, cyclopentadiene pentamer, and the like; and $C_2$-$C_{12}$ hydrocarbyl substituted norbornenes such as 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like. Backbones derived from any of these materials are considered within the scope of the present invention Brush block copolymers of the present invention are conveniently prepared by sequentially reacting at least two types of polymerizable polymer arms, each polymer arm preferably having a different set or mix of repeating units. The chemical dissimilarity of the two polymer arms results in polymer blocks which self-organize or self-assemble into structures having segregated lamella. The periodicity of the lamellae depends at least on the lengths of the polymer arms and the size of the polymer blocks.

In some embodiments, the first and second linear polymer arms independently contain alkylene, alkenylene, amido, carbonate, ester, ether, urethane repeating units, or a combination thereof The nature of these polymers and polymer arms are not limited to the examples provided in the present disclosure and may include optionally substituted aliphatic polyesters, poly(amino acids), copoly(ether-esters), polyalkylenes oxalates, polyamides, poly(iminocarbonates), polyorthoesters, polyoxaesters, polyamidoesters, polyoxaesters containing amine groups, poly(anhydrides), polyphosphazenes, polysiloxanes, polyethylene, polyethylene terephthalate, poly(tetrafluoroethylene), polycarbonate, polypropylene, polylactic acid (PLA), polyglycolic acid (PGA), polycaprolactone (PCL), poly(Lactide-co-Glycolide) (PLGA), polydioxanone (PDO), trimethylene carbonate (TMC), polyethyleneglycol (PEG), polyurethanes, polyacrylonitriles, polyanilines, polyvinyl carbazoles, polyvinyl chlorides, polyvinyl fluorides, polyvinyl imidazoles, polyvinyl alcohols, polystyrenes and polyvinyl phenols), aliphatic polyesters, polyacrylates, polymethacrylates, polystyrenes, chlorosulphonated polyolefins, and copolymers thereof In the present invention, in certain embodiments, each of the first and second pendant linear polymer arms each comprise different repeating monomer units. In other embodiments, each arm independently has a degree of polymerization (DP) in a range of from about 20 to about 40, from about 40 to about 80, from about 80 to about 120, from about 120 to about 160, from about 160 to about 200, and any combination of two or more of these ranges.

In still other embodiments, each first and second linear polymer arms are independently characterized by polydispersity indices in range of from about 1 to about 1.2. In preferred embodiments, these polydispersity indicies are in a range of from about1.0 to about 1.1, from about 1.0 to about 1.08, from about 1.0 to about 1.06, from about 1.0 to about 1.4, from about 1.0 to about 1.02, or from about 1.0 to about 1.01. These polydispersity indices are most conveniently determined using the polymerizable polymer arms.

In still other embodiments, the first and second block copolymer moieties are present in the brush block copolymer in a ratio of molecular weights of the first and second polymer block is in a range of from about 60:40 to about 40:60. In other independent embodiments, this ratio of molecular weights are in a range of from about 55:45 to about 45:55, from about 52:48 to about 48:52, or about 50:50. As shown in the Examples, cleaner performance is seen as the ratio of molecular weights of the first and second polymer block approaches 50:50. These weight ratios are most conveniently determined either spectrally (e.g., NMR, depending on the chemical nature of each polymer arm) or by mass balance during the synthesis of the brush block copolymer. Specific methods are also provided in the Examples.

Every combination of these ranges (degree of polymerization, polydispersity index, chemical compositions) are considered separate embodiments. When the structures are contemplated for use as photonic crystals, uniformity and consistency of structure is preferred, such that, as shown in the Examples, structures in which the polydispersity indicies of both of the first and second polymer arms are the same, and from about1.0 to about 1.02 and where the ratio of the molecular weights of the first and second block is about 50:50, or within practical experimental variance of this ratio.

Additionally, the overall brush block copolymer may be characterized as having an overall weight averaged molecular weight in a range of from about 800 kDa to about 5000 kDa. Additional embodiments provide that the overall weight averaged molecular weight is in a range of from about 800 kDa to about 5000 or in a range of from about 800 kDa to about 1000 kDa, from about 1000 kDa to about 1400 kDa, from about 1400 kDa to about 1800 kDa, from about 1800 kDa to about 2200 kDa, from about 2200 kDa to about 2600 kDa, from about 2600 kDa to about 3000 kDa, from about 3000 kDa to about 3400 kDa, from about 3400 kDa to about 3800 kDa, from about 3800 kDa to about 4200 kDa, from about 4200 kDa to about 4600 kDa, from about 4600 kDa to about 5000 kDa, or any combination of two of more of these ranges. For example, the range may be from about 800 kDa to about 3000 kDa.

In separate embodiments, the chemical natures of the first and second arm are the same or similar. In other embodiments, the chemical natures of the first and second arms are different. Preferably, they are different. In some embodiments, one polymer arm comprises structures deemed polar and the other polymer arm comprises structures deemed non-polar. In other embodiments, one polymer arm comprises structures which are characterized or recognized as hydrophilic and the other polymer arm comprises structures which are characterized or recognized as hydrophobic. While it is difficult to quantify these differences, the chemical natures of the first and second polymer arms are deemed sufficiently different if the resulting brush block copolymer organizes itself to exhibit lamellar regions comprising the different polymer phases. As exemplified in the Examples, in certain embodiments, one of the polymer arms comprises an optionally substituted polystyrene (which may be characterized as non-polar and/or hydrophobic) and the second comprises an optionally substituted polyglycolic acid (which may be characterized as polar and/or hydrophilic).

The present inventive compositions also comprise first and second linear polymers incorporated into the brush block copolymer structure. The term "incorporated into" refers to a state of physical mixing, such that the presence of the first and second linear polymers causes a change in the physical structure of the brush block copolymer, for example, as evidence by a relaxation of the structure, a swelling, or a change in the lamellar periodicity of the brush block copolymer.

Also, as used herein, the terms "first polymer," "second polymer," or more generally "a polymer" refer to polymer types, not single strands of polymer, unless otherwise stated]

These first and second linear polymers independently have weight-averaged molecular weights in a range of from about 1 kDa to about 20 kDa. In some embodiments, this includes weight-averaged molecular weights in a range of from about 1 kDa to about 2 kDa, from about 2 kDa to about 3 kDa, from about 3 kDa to about 4 kDa, from about 4 kDa to about 6 kDa, from about 6 kDa to about 8 kDa, from about 8 kDa to about 10 kDa, from about 10 kDa to about 12 kDa, from about 12 kDa to about 14 kDa, from about 14 kDa to about 16 kDa, from about 16 kDa to about 18 kDa, from about 18 kDa to about 20 kDa, or any combination of two or more of these ranges.

In preferred embodiments, the chemical natures of the first and second linear polymers are the same as or similar to those of the first and second polymer arms, respectively. Again, the concept of same or similar in this context is difficult to quantify precisely, though it is expected that in many cases, the person of skill in the art would be able to distinguish polymers which are grossly chemically different. For example, in some embodiments, the first polymer and first polymer arm may be similar in that both are polar, both are non-polar, both are hydrophobic, or both are hydrophilic. For example, in the Examples, the use of MMA (poly (methyl methacrylate, or PMMA) as a non-polar polymer blended with the non-polar polystyrene polymer arm. More clearly, the first polymer and first polymer arm may comprise the same repeating monomer units. For example, as exemplified herein, both the first polymer and first polymer arm may comprise polystyrene. Or, the first polymer and first polymer arm may comprise the same repeating monomer units, except that one or the other (or both) may contain a functionalized derivative of those monomer units. Such functional groups may comprise alkoxy, alkoxycarbocy, alkyl, amino, amido, aryl, azido, carboxylato, cyano, halo (preferably chloro), hydroxy, hydroxycarboxy, phosphino, thiol, or other functional group substituent. For example, the first polymer arm may comprise polystyrene and the first polymer may comprise a polystyrene polymer or copolymer comprising any one or more functional group substituent. See Examples.

The presence of any amount of optional functionalization depends on the desired effect to be achieved. In certain embodiments, this degree of functionalization may range from 0 to 10 mol %, from 10 to 20 mol %, from 20 to 30 mol %, from 30 to 50 mol %, from 50 to 80 mol %, of the respective polymer or polymer arm, or any combination of two or more of these ranges. The specific degree of functionalization depends on the nature of the functional group and the effect desired. Obviously, the lesser the degrees of modification, the more compatible the polymers and polymer arms, and the easier (more efficient) the blending Additional embodiments provide that the first polymer and first polymer arm each contains "complementary" functional groups which, when subject to an appropriate trigger, are capable of cross-linking together. For example, protected carboxylic acids and amines/alcohols, azides and alkyne pairs, and thiols and thiols and alkenes are just a few exemplary couples that can be triggered to crosslink the polymers and polymer arms upon application of the appropriate stimuli.

Beyond this, polymer blends are generally recognized as broadly divided into three categories: immiscible (or heterogeneous), compatible, and miscible (or homogeneous) polymer blends. Each of these categories may be seen as distinguishing chemically different and similar/same polymers for present purposes. For example, compatible polymer blends mmiscible polymer blend that exhibits macroscopically uniform physical properties, caused by sufficiently strong interactions between the component polymers. Miscible (homogeneous) polymer blends are those which provide a single-phase structure, typically exhibiting a single glass transition temperature. Non-exclusive examples of miscible polymer blends include homopolymers of polyphenylene oxide and polyphenylene oxide-polystyrene copolymers; polyethylene terephthalate (PET) and polybutylene terephthalate (PBT); and poly(methyl methacrylate) (PMMA) and polyvinylidene fluoride (PVDF);

It should be appreciated that all of the language of the preceding paragraphs directed to the relationship between the first polymer and first polymer is also relevant and describes the relationship between the second polymer and the second polymer arm.

Within the compositions, the first and second polymers are present, with respect to each other, in a weight ratio of from about 60:40 to about 40:60. In other independent embodiments, this weight ratio is in a range of from about 55:45 to about 45:55, from about 52:48 to about 48:52, or about 50:50. In more preferred embodiments, the weight ratio of the first and second polymers is the same or within 2 wt % of the molecular weight ratio of the first and second block. In most preferred embodiments, the molecular weight ratio of the first and second block is about 50:50, and the weight ratio of the first and second polymers is also about 50:50.

With respect to the loading of the combined first and second polymers into the brush block copolymer, in certain embodiments, the weight ratio of the former into the latter is in a range of from about 2:98 to about 80:20 (i.e., from about 2 parts polymer : 98 parts brush block copolymer to about 80 parts polymer : 20 parts brush block copolymer). In separate, independent embodiments, this weight ratio may be in a range of from about 2:98 to about 4:96, from about 4:96 to about 8:92, from about 8:92 to about 12:88, from about 12:88 to about 16:84, from about 16:84 to about 20:80, from about 20:80 to about 24:76, from about 24:76 to about 28:72, from about 28:72 to about 32:68, from about 32:68 to about 36:64, from about 36:64 to about 40:60, from about 40:60 to about 44:56, from about 44:56 to about 48:52, from about 48:52 to about 52:48, from about 52:48 to about 56:44, from about 56:44 to about 60:40, from about 60:40 to about 64:36, from about 64:36 to about 68:32, from about 68:32 to about 72:28, from about 72:28 to about 76:24, from about 76:24 to about 80:20, or any combination of two or more of these ranges. Stated differently, the compositions may comprise or consist essentially of combinations of first and second polymers, present within the structure of the brush block copolymer, in a range of from 0 to 5 wt %, from 5 to 10 wt %, from 10 to 15 wt %, from 15 to 20 wt %, from 20 to 25 wt %, from 25 to 30 wt %, from 30 to 35 wt %, from 35 to 40 wt %, from 40 to 45 wt %, from 45 to 50 wt %, from 50 to 55 wt %, from 55 to 60 wt %, from 60 to 65 wt %, from 65 to 70 wt %, from 70 to75 wt %, from 75 to 80 wt %, or any combination of two or more of these ranges.

As described herein, the presence of the first and second polymers affects the lamellar periodicity in predictable and meaningful ways, for example, allowing access to increased ranges of photonic band gaps of the compositions. In some independent embodiments, the structure of the brush block copolymer, in the absence of the first and second polymers, can be defined as exhibiting a lamellar periodicity in a range of from about 10 nm to about 520 nm. In independent embodiments, this range can be from about 10 nm to 20 nm, from 20 nm to 60 nm, from 60 nm to 100 nm, from 100 nm to 140 nm, from 140 nm to 160 nm, from 160 nm to 200 nm, from 200 nm to 240 nm, from 240 nm to 280 nm, from 280 nm to 320 nm, from 320 to 360 nm, from 360 nm to 400 nm, from 440 nm to 480 nm, from 480 to 520 nm, or any combination of two or more of these ranges. In other independent embodiments, the structure of the brush block copolymer, in the presence of the first and second polymer, can be defined as exhibiting a lamellar periodicity in a range of from about 10 nm to about 520 nm. In independent embodiments, this range can be from about 60 nm to 100 nm, from 100 nm to 140 nm, from 140 nm to 160 nm, from 160 nm to 200 nm, from 200 nm to 240 nm, from 240 nm to 280 nm, from 280 nm to 320 nm, from 320 to 360 nm, from 360 nm to 400 nm, from 440 nm to 480 nm, from 480 nm to 520 nm, from 520 nm to 560 nm, from 560 nm to 600 nm. Shifts caused by the inclusion of the added first or second polymer depend on the specific nature of the polymer and its amount, and can be on the order of from about 0 nm to about 500 nm. Specific embodiments include shifts in this range, and each of the ten nanometer (or multiples thereof) increments therebetween.

In certain of these embodiments, the compositions exhibits a photonic band gap (wavelength of maximum reflection) at a wavelength in a range of from about 200 nm to about 1750 nm. In other embodiments, the compositions exhibit a photonic band gap at a wavelength in a range of from about 200 nm to 250 nm, from 250 nm to 300 nm, from 300 nm to 350 nm, from 350 nm to 400 nm, from 400 nm to 450 nm, from 450 nm to 500 nm, from 500 nm to 550 nm, from 550 nm to 600 nm, from 600 nm to 650 nm, from 650 nm to 700 nm, from 700 nm to 750 nm, from 750 nm to 800 nm, from 800 nm to 850 nm, from 850 nm to 900 nm, from 900 nm to 950 nm, from 950 nm to 1000 nm, from 1000 nm to 1050 nm, from 1050 nm to 1100 nm, from 1100 nm to 1150 nm, from 1150 nm to 1200 nm, from 1200 nm to 1250 nm, from 1250 nm to 1300 nm, from 1300 nm to 1350 nm, from 1350 nm to 1400 nm, from 1400 nm to 1450 nm, from 1450 nm to 1500 nm, from 1500 nm to 1550 nm, from 1550 nm to 1600 nm, from 1600 nm to 1650 nm, from 1650 nm to 1700 nm, from 1700 nm to 1750 nm, or any combination of two or more of these ranges.

In other independent embodiments, where the photonic bandgap is 750 nm or higher, composition transmits at least about 30% of incident light over a series of wavelengths in the range from about 350 nm to about 600 nm. In other independent embodiments, where the photonic bandgap is 750 nm or higher, the composition transmits at least about 30%, 40%, 50%, 60%, 70%, 80%, 90% of incident light over a series of wavelengths in the range from about 350 nm to about 600 nm. In additional independent embodiments, the respective transmittances are observed over the entire 350 nm to about 600 nm range.

These combinations of properties can be achieved by election of appropriate materials and polymer loadings, making the compositions amenable for preparing tunable compositions, as well as devices incorporating the compositions. For example, wavelength-specific reflective coatings may be made from these compositions, offering the possibilities for photonic displays or photochromic sensors. Where the compositions exhibit sufficiently high photonic bandgaps, the materials can be incorporated into infrared reflective window treatments or other surface where it is desirable to reduce the solar heat load; on walls of buildings or other structures or equipment, for example. Where the photonic band gaps are sufficiently high, the compositions may be incorporated into waveguides, laser cavities, chemochromic sensors, solar cells, and dielectric mirrors. Each of these devices incorporating the inventive compositions is considered within the scope of the present invention.

Also, whereas the invention to this point has largely been described in terms of the compositions, the methods of making and post-treating these compositions are also within the scope of this disclosure. In certain embodiments, these methods comprise incorporating any of the respective first and second polymers into the corresponding brush block copolymers to arrive at the claimed compositions. Again, the term "incorporating into," as described above, may comprise physical blending, preferably with the use of solvent, and if using solvents, further lyophilizing, or otherwise removing the solvents from the polymer mixtures. These lyophilized or desolvated admixtures may then be subject to any technique that crystallizes or aligns the composition or allows the lamellae to swell or order. Exemplary techniques for this purpose are described in the Examples.

Additionally, once formed, these compositions may be subjected to electromagnetic fields. This may be useful, for example, in helping the lamellae to align or to effect the expansion/contraction of the lamellae. These treatments may be applied before or after the solvents (if applicable) are removed.

In those cases where the respective polymers and polymer arms are functionalized to contain crosslinkable functional groups, the compositions may be subjected to the triggering mechanism (e.g., UV light, heat, microwave radiation, or chemical stimulus) that effects this crosslinking. For example, photolyzing an azide functional group can be used to form radical species that react with any nearby organic molecule. Deprotecting protected amines or carboxylic acids in the presence of their complement may also be useful methods in this regard.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method or process steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) of a process is the ability to shift the photonic bandgap of a one-dimensional photonic crystal.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

Throughout this specification, words are to be afforded their normal meaning, as would be understood by those skilled in the relevant art. However, so as to avoid misunderstanding, the meanings of certain terms will be specifically defined or clarified.

"Optional" or "optionally" means that the subsequently described circumstance may or may not occur, so that the description includes embodiments where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present. Similarly, the phrase "optionally isolated" means that the target material may or may not be separated from other materials used or generated in the method, and, thus, the description includes separate embodiments where the target molecule or other material is separated and where the target material is not separated, such that subsequence steps are conducted on isolated or in situ generated product.

The acronym "RCP" refers to random co-polymer, and typically refers to the optionally or partially functionalized polymer/copolymer. The terms "PS" or "P-S" refer to polystyrene. The acronyms "BBCP," "PLA," and "HP" refer to brush block copolymer, polylactic acid, and homopolymer, respectively, as used herein.

The following listing of embodiments is intended to complement, rather than displace or supersede, the previous descriptions.

Embodiment 1. A composition comprising:
(a) a brush block copolymer comprising a backbone and pendant polymer arms,
  (i) the brush block copolymer having an overall weight averaged molecular weight in a range of from about 800 kDa to about 5000 kDa, preferably 800-3000 kDa, and having a polydispersity index (PDI) in a range of about 1 to about 1.2, preferably 1-1.04;
  (ii) the block copolymer comprising first and second block copolymer moieties, the first block comprising a first pendant polymer arm and the second block comprising a second pendant polymer arm, the first and second block copolymer moieties being present in a ratio of molecular weights in a range of from about 60:40 to about 40:60, preferably 52:48 to 48:52;
  (iii) the first and second pendant linear polymer arms each comprising different repeating monomer units, each arm independently having a degree of polymerization (DP) in a range of from about 20 to about 200 and a polydispersity index in range of from about 1 to about 1.2, preferably 1-1.04;
(b) a first linear polymer having a weight averaged molecular weight in a range of from about 1 kDa to about 20 kDa, preferably 3 kDa to 14 kDa, and compatible with the first pendant polymer arm, and further optionally functionalized;
(c) a second linear polymer having a weight averaged molecular weight in a range of from about 1 kDa to about 20 kDa, preferably 3 kDa to 14 kDa, and compatible with the second pendant polymer arm, and further optionally functionalized;
wherein the first and second linear polymers are present, with respect to each other, in a weight ratio of from about 60:40 to about 40:60, preferably 52:48 to 48:52; and
wherein the first and second linear polymers are together present, with rsepect to the brush block copolymer, in a weight ratio of from about 2:98 to about 80:20.

Embodiment 2. The composition of Embodiment 1, wherein the backbone of the brush block copolymer comprises optionally substituted alkylene, alkenylene, or both alkylene or alkenylene linkages.

Embodiment 3. The composition of Embodiment 1 or 2, wherein the backbone of the brush block copolymer is derived from an enyne, diyne, or ring-opening metathesis polymerization (ROMP) reaction.

Embodiment 4. The composition of any one of Embodiments 1 to 3, wherein the backbone of the brush block copolymer comprises an optionally substituted polynorbornene or an optionally substituted poly(7-oxa-bicyclo[2.2.1]hept-2-ene)

Embodiment 5. The composition of any one of Embodiments 1 to 4, wherein the first and second linear polymer arms independently contains alkylene, alkenylene, amido, carbonate, ester, ether, urethane repeating units, or a combination thereof. In some of these embodiments, the first and second polymer arms are different and independently comprise optionally substituted aliphatic polyesters, poly(amino acids), copoly(ether- esters), polyalkylenes oxalates, polyamides, poly(iminocarbonates), polyorthoesters, polyoxaesters, polyamidoesters, polyoxaesters containing amine groups, poly(anhydrides), polyphosphazenes, polysiloxanes, polyethylene, polyethylene terephthalate, poly(tetrafluoroethylene), polycarbonate, polypropylene, polylactic acid (PLA), polyglycolic acid (PGA), polycaprolactone (PCL), poly(Lactide-co-Glycolide) (PLGA), polydioxanone (PDO), trimethylene carbonate (TMC), polyethyleneglycol (PEG), polyurethanes, polyacrylonitriles, polyanilines, polyvinyl carbazoles, polyvinyl chlorides, polyvinyl fluorides, polyvinyl imidazoles, polyvinyl alcohols, polystyrenes and poly (vinyl phenols), aliphatic polyesters, polyacrylates, polymethacrylates, polystyrenes, chlorosulphonated polyolefins, and copolymers thereof Embodiment 6. The composition of any one of Embodiments 1 to 5, wherein the first linear polymer contains the same repeating monomer units as present in the first pendant polymer arm. In a related Embodiment, the composition of any one of Embodiments 1 to 5, wherein the second linear polymer contains the same repeating monomer units as present in the second pendant polymer arm.

Embodiment 7. The composition of any one of Embodiments 1 to 6, wherein the first linear polymer contains a functionalized derivative of the same repeating monomer units as present in the first pendant polymer arm. In a related Embodiment, the composition of any one of Embodiments 1 to 5, wherein the second linear polymer contains a functionalized derivative of the same repeating monomer units as present in the second pendant polymer arm.

Embodiment 8. The composition of any one of Embodiments 1 to 7, wherein the functionalization comprises the incorporation of an alkoxy, alkoxycarbocy, alkyl, amino, aryl, azido, carboxylato, cyano, halo (preferably chloro), hydroxy, hydroxycarboxy, nitro, phosphino, or thiol.

Embodiment 9. The composition of any one of Embodiments 1 to 7, wherein the first or second polymer arm comprises a polystyrene.

Embodiment 10. The composition of any one of Embodiments 1 to 7, wherein the first or second polymer comprises a functionalized polystyrene.

Embodiment 11. The composition of any one of Embodiments 1 to 9, wherein the brush block copolymer, in the absence of the first and second polymer, exhibits a lamellar periodicity in a range of from about 10 nm to about 500 nm, preferably from 100 nm to about 400 nm Embodiment 12. The composition of any one of Embodiments 1 to 10, wherein the brush block copolymer, in the presence of the first and second linear polymer, exhibits a lamellar periodicity in a range of from about 60 nm to about 600 nm, preferably from 100 nm to about 600 nm.

Embodiment 13. The composition of any one of Embodiments 1 to 11, wherein the composition exhibits a photonic band gap (reflection maximum) at a wavelength in a range of from about 200 nm or 250 nm to about 1750 nm.

Embodiment 14. The composition of any one of Embodiments 1 to 12, wherein the composition transmits at least about 30%, 40%, 50%, 60%, 70%, 80%, 90% of incident light over a series of wavelengths in the range from about 350 nm to about 600 nm.

Embodiment 15. A wavelength selective reflective coating, preferably an infrared reflective coating, comprising a composition of any one of Embodiments 1 to 13

Embodiment 16. A waveguide comprising a composition of any one of Embodiments 1 to 13 or a reflective coating of Embodiment 15.

Embodiment 17. A method of preparing a composition of any one of the Embodiments 1 to 14, comprising incorporating the first and second polymer into the structure of the brush block copolymer.

Embodiment 18. The method of Embodiment 17, wherein
(a) the brush block copolymer comprises a backbone and pendant polymer arms,
  (i) the brush block copolymer has an overall weight averaged molecular weight in a range of from about 800 to about 3000 kDa, and a polydispersity index (PDI) in a range of about 1 to about 1.04];
  (ii) the block copolymer comprises first and second block copolymer moieties, the first block comprising a first pendant polymer arm and the second block comprising a second pendant polymer arm, the first and second block copolymer moieties being present in a ratio of molecular weights in a range of from about 52:48 to 48:52;
  (iii) the first and second pendant polymer arms each comprise different repeating monomer units, each arm independently having a degree of polymerization (DP) in a range of from about 20 to about 200 and a polydispersity index in range of from about 1 to about 1.04]; and wherein
(b) the first linear polymer has a weight averaged molecular weight in a range of from about 3 kDa to about 14 kDa and comprising the same repeating monomer units as present in the first pendant polymer arm, except that the repeating monomer units in the first polymer are further optionally functionalized; and
(c) the second linear polymer has a weight averaged molecular weight in a range of from about 3 kDa to about 14 kDa and comprising the same repeating monomer units as present in the second pendant polymer arm, except that the repeating monomer units in the second polymer are further optionally functionalized Embodiment 19, wherein the the brush block copolymer is a symmetric- brush block copolymer.

Embodiment 20. A method comprising subjecting the composition of any one of Embodiments 1 to 14 to an electromagnetic field Embodiment 21. A method comprising crosslinking the respective polymer and polymer arms of the composition of any one of Embodiments 1 to 14

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees Celsius, pressure is at or near atmospheric.

It is known that adding HPs to linear block copolymers causes them to swell in a predictable manner, as the HPs both increase the inherent "bulk" of a given material block, as well as relieve polymer strain within the blocks. Nevertheless, it is not necessarily obvious that such a methodology would be readily applicable to the BBCPs, as they are generally regarded as rigid rods—indeed, the increased steric hindrance that causes the BBCP rod-like morphology is the very reason they are able to achieve lamellar arrays with large periodicities in the first place.

Figure 2:
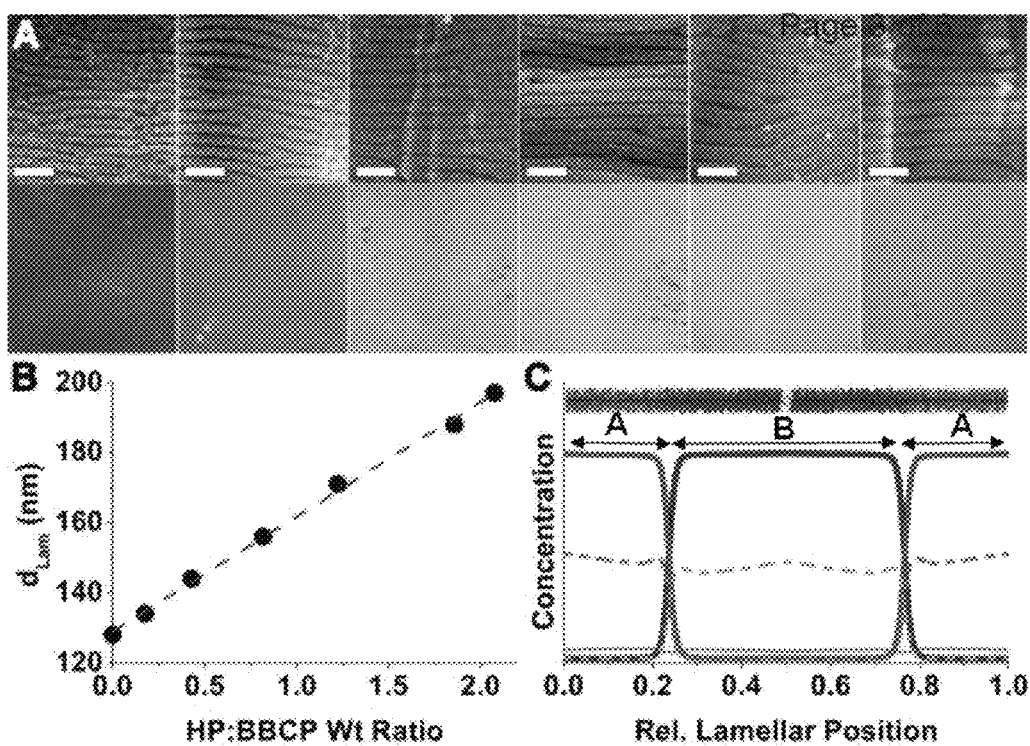
FIG. 2 shows (A) SEM cross sectional images of BBCP arrays with 0, 30, 45, 55, 65, and 67.5 wt % HP (wt ratio of 0 to about 2); below each SEM image is a plain view image of the film showing increasing photonic band gap positions with added HP. Scale bars are 500 nm. (B) Lamellar domain spacing as a function of added HP (same films as in (A)). (C) Locations of BBCPs and HPs within a lamellae as determined by SCFT simulations (sample is 45 wt % HP). Blue traces are PS, green traces are PLA, red trace is the polynorbornene backbone; solid lines are BBCP, dashed lines
Figure 5A:
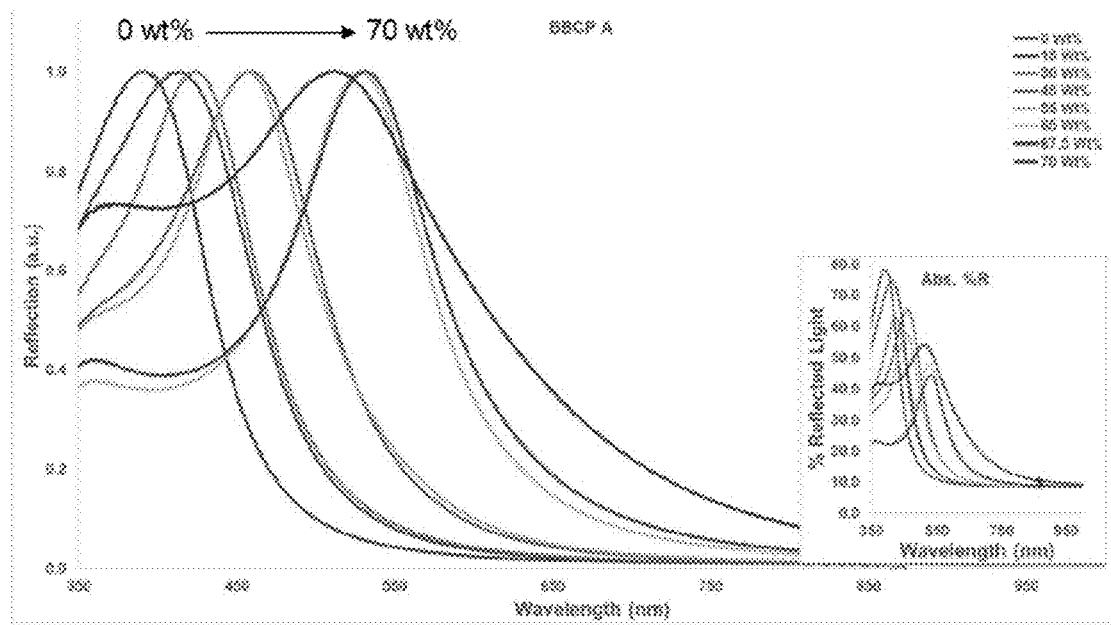
FIGS. 5A and 5B show Brush Block Copolymer A Blend Information.
Figure 5B:
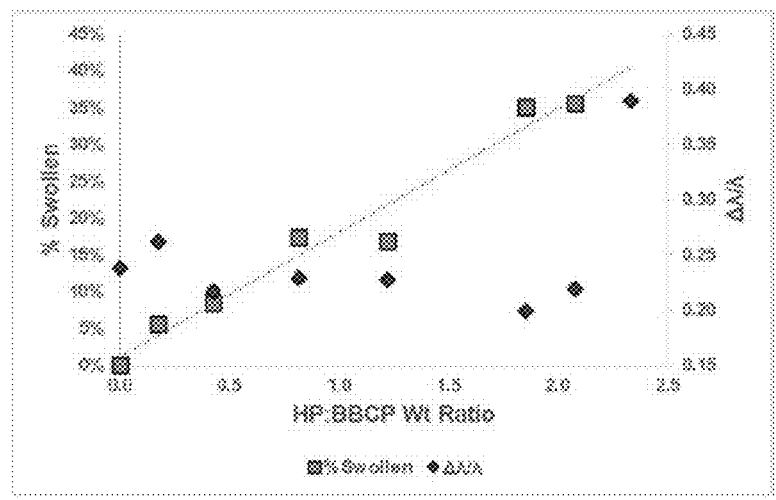
Figure 6A:
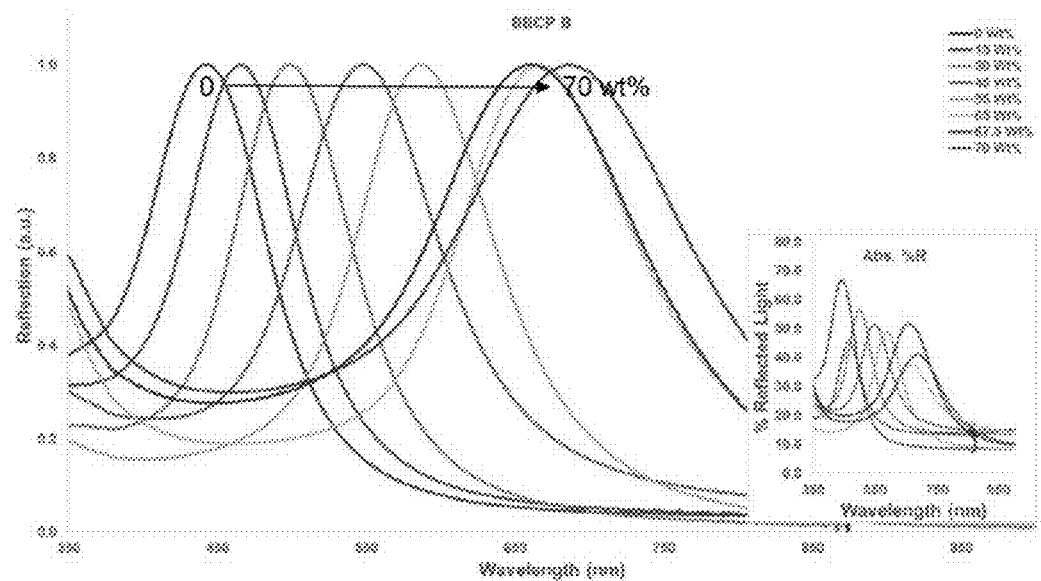
FIGS. 6A and 6B show Brush Block Copolymer B Blend Information.
Figure 6B:
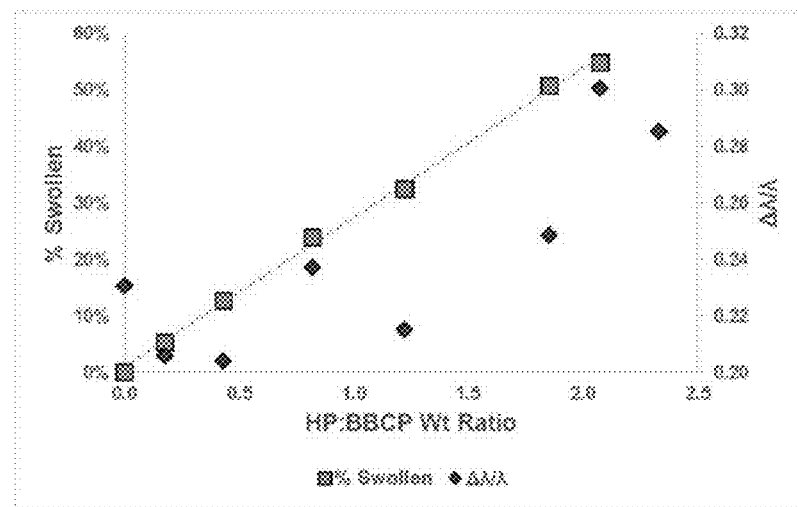
Figure 7A:
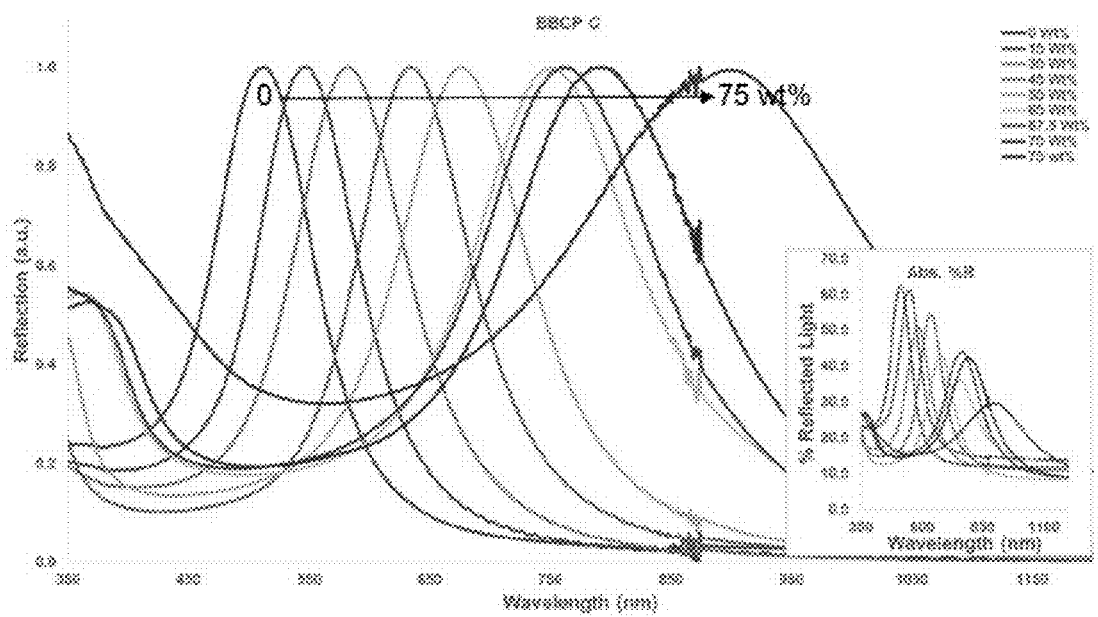
FIGS. 7A and 7B show Brush Block Copolymer C Blend Information.
Figure 7B:
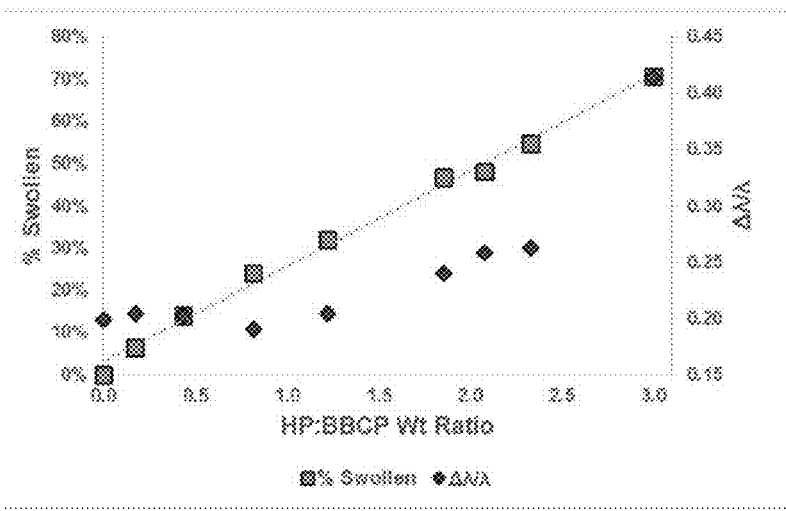
Figure 8A:
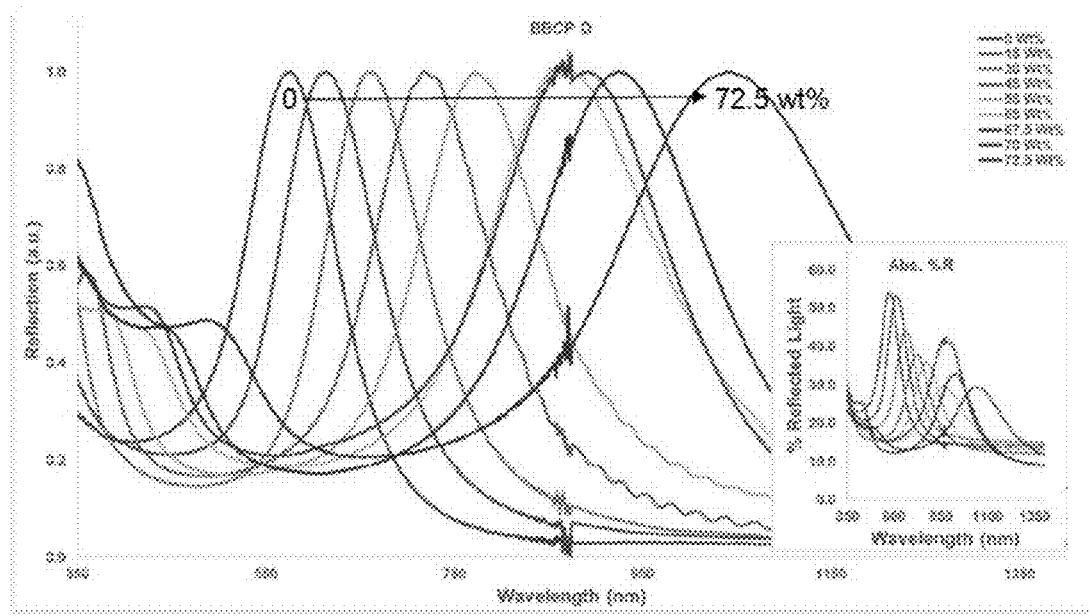
FIGS. 8A and 8B show Brush Block Copolymer D Blend Information.
Figure 8B:
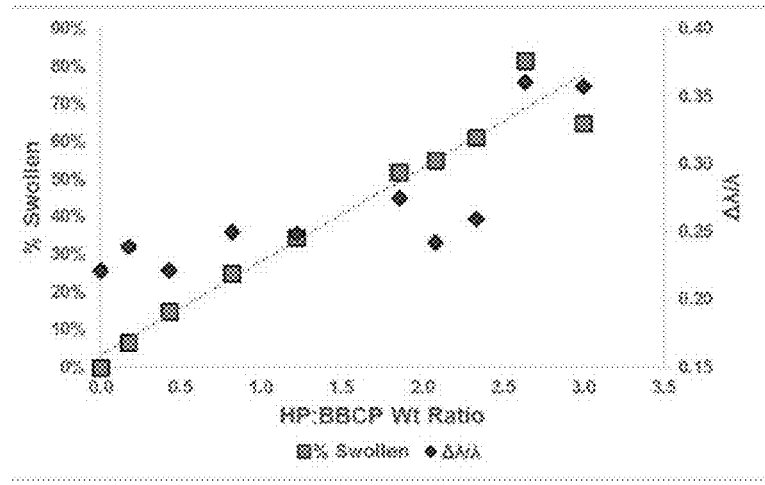
Figure 9A:
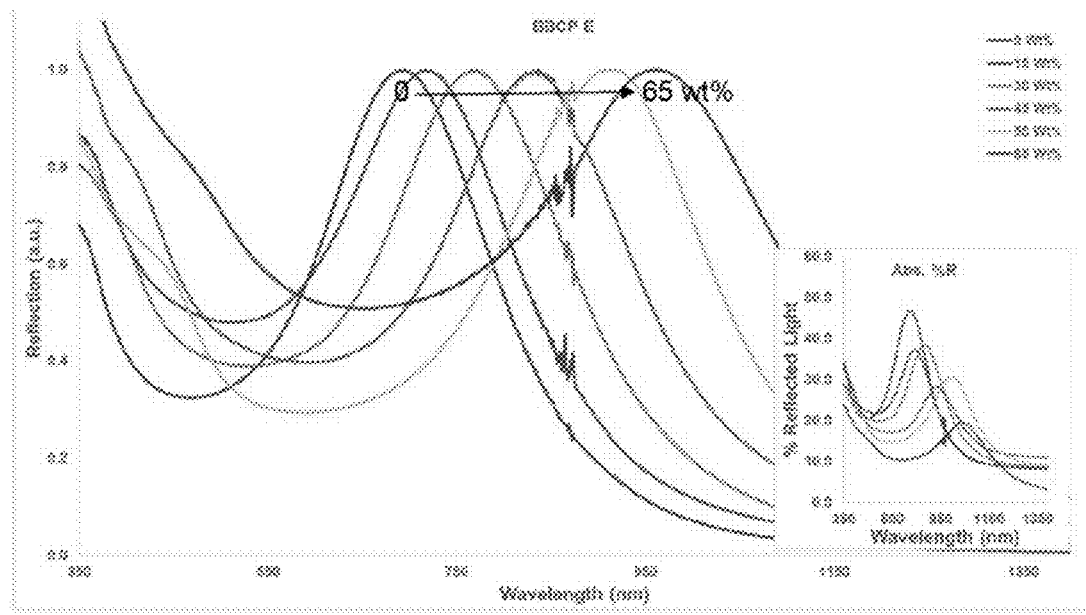
FIGS. 9A and 9B show Brush Block Copolymer E Blend Information.
Figure 9B:
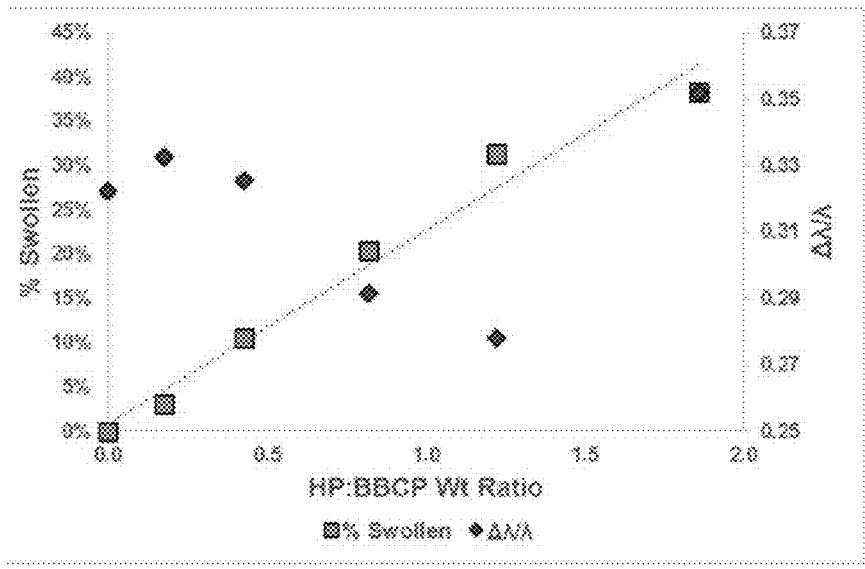
Figure 10A:
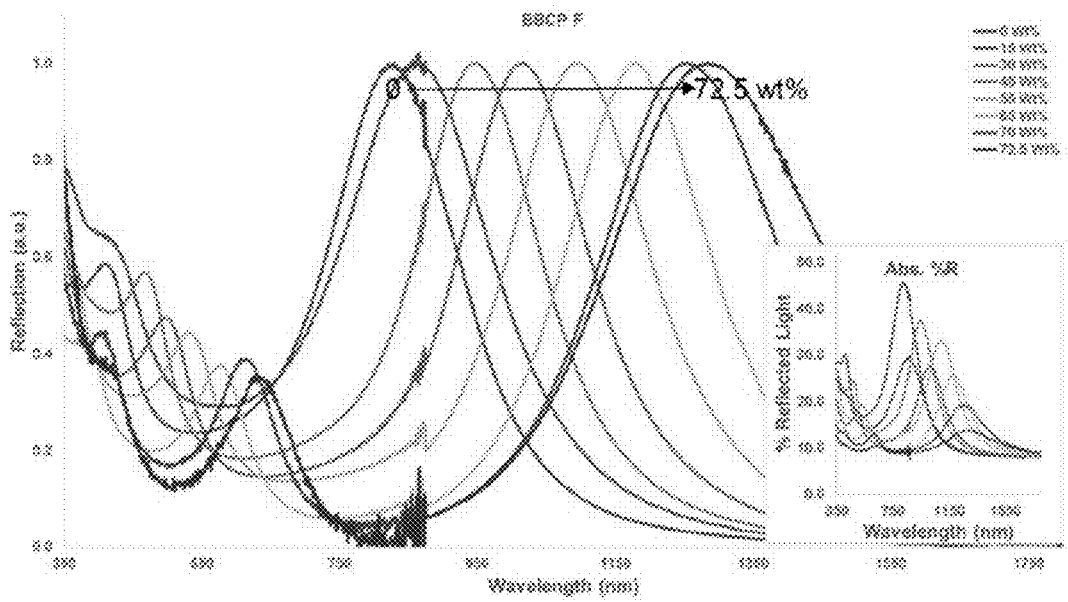
FIGS. 10A and 10B show Brush Block Copolymer F Blend Information.
Figure 10B:
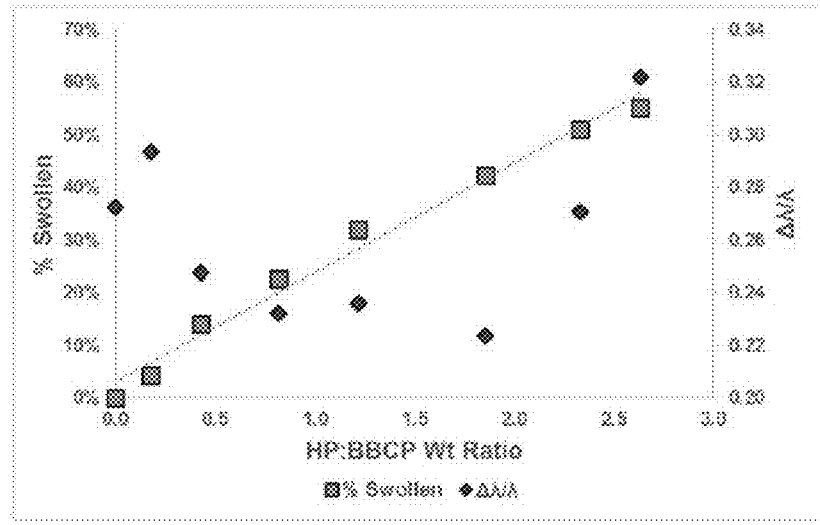
Figure 11A:
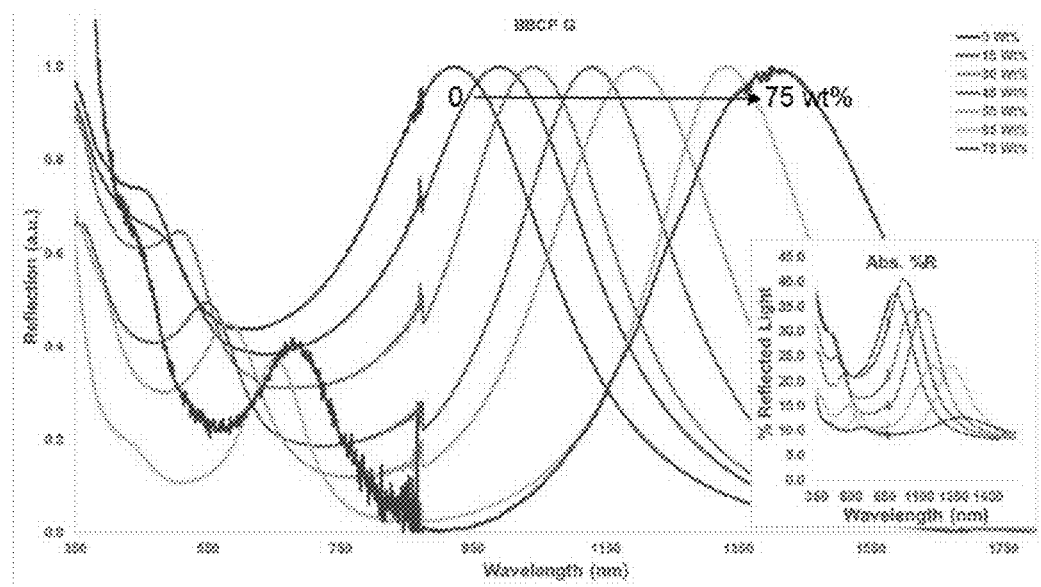
FIGS. 11A and 11B show Brush Block Copolymer G Blend Information.
Figure 11B:
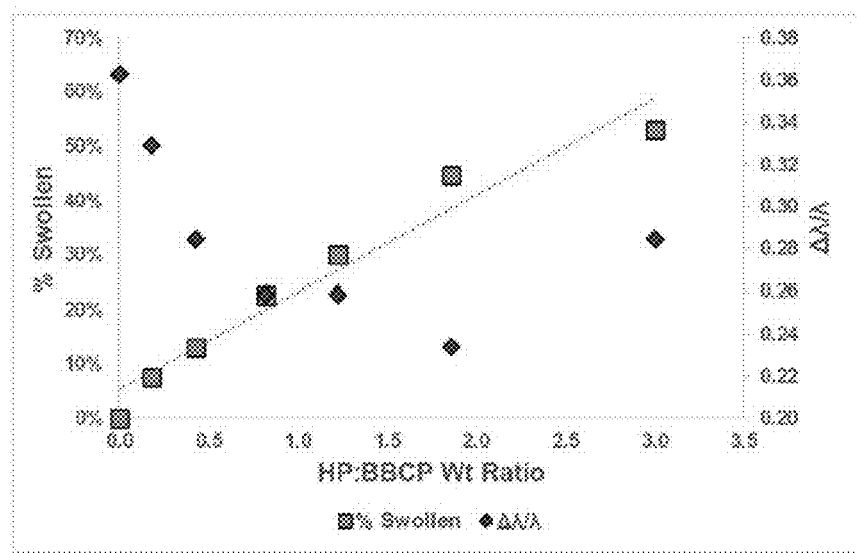
Figure 12:
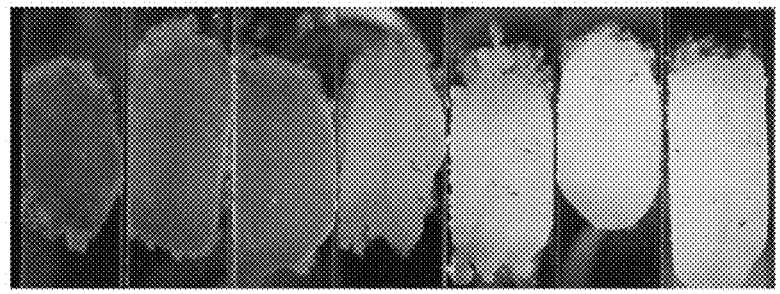
FIGS. 12 to 16 show photos of BBCP A through F Blends, respectively (from left, 0%, 15%, 30%, 45%, 55%, 65%).
Figure 13:
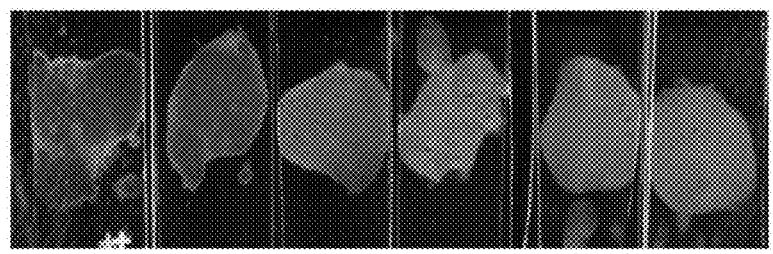
Figure 14:
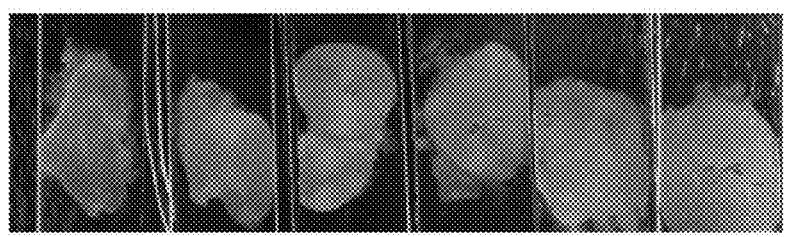
Figure 15:
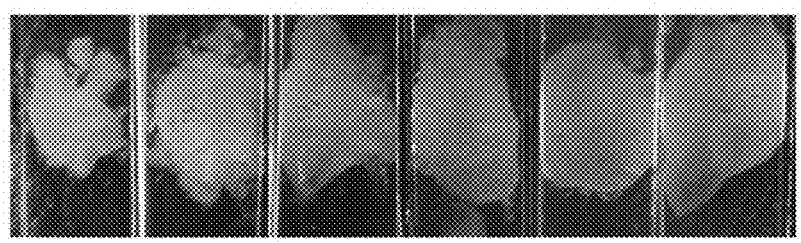
Figure 16:
Figure 17:
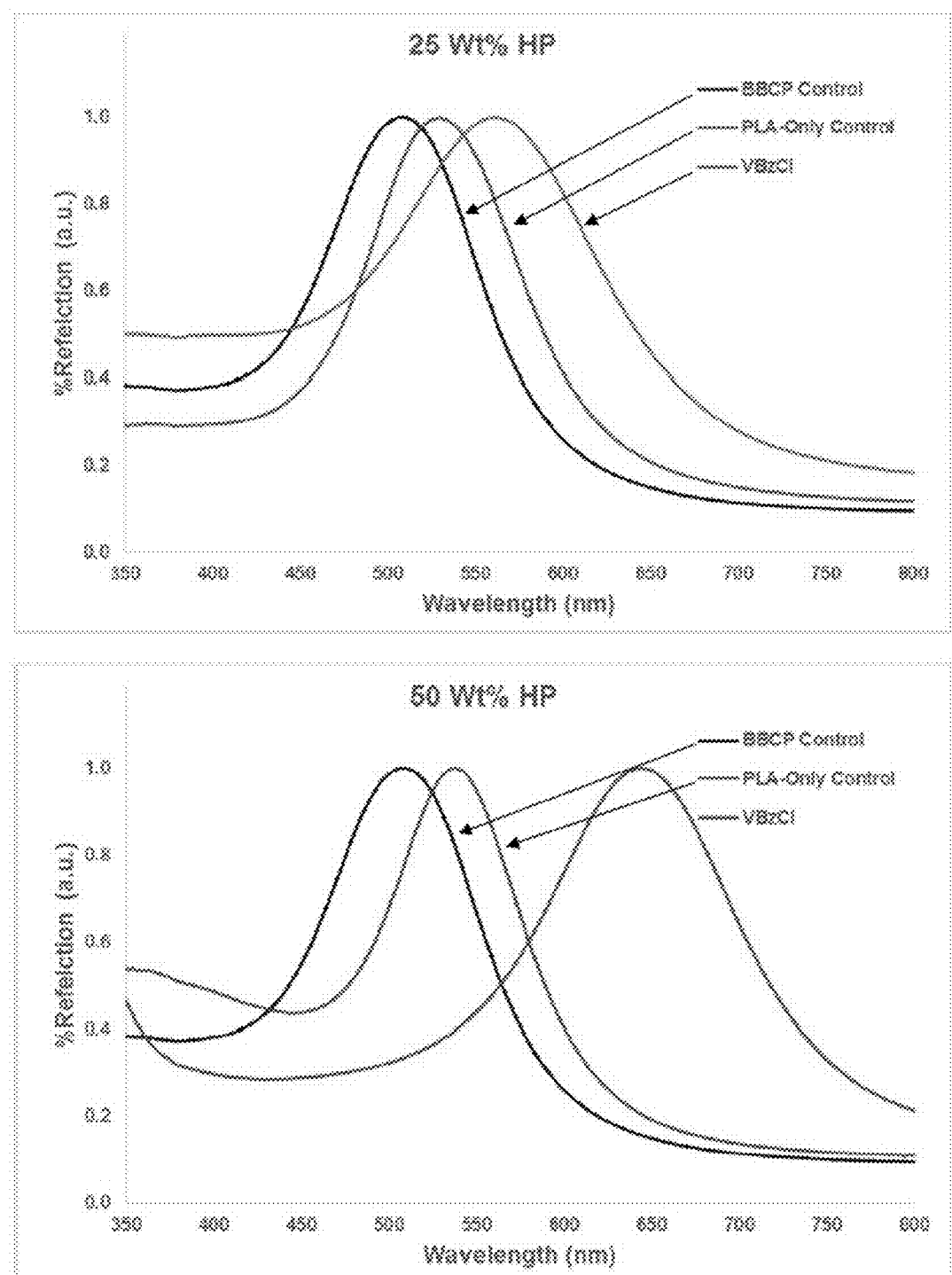
FIG. 17 shows UV-Vis spectra of P-S-VBzCl/BBCP Blends. Note that the total weight % of homopolymer is equal amounts RCP and PLA-HP. Samples in which the same amount of PLA-HP was added, but the RCP was not added are provided as controls for comparison.
Figure 18:
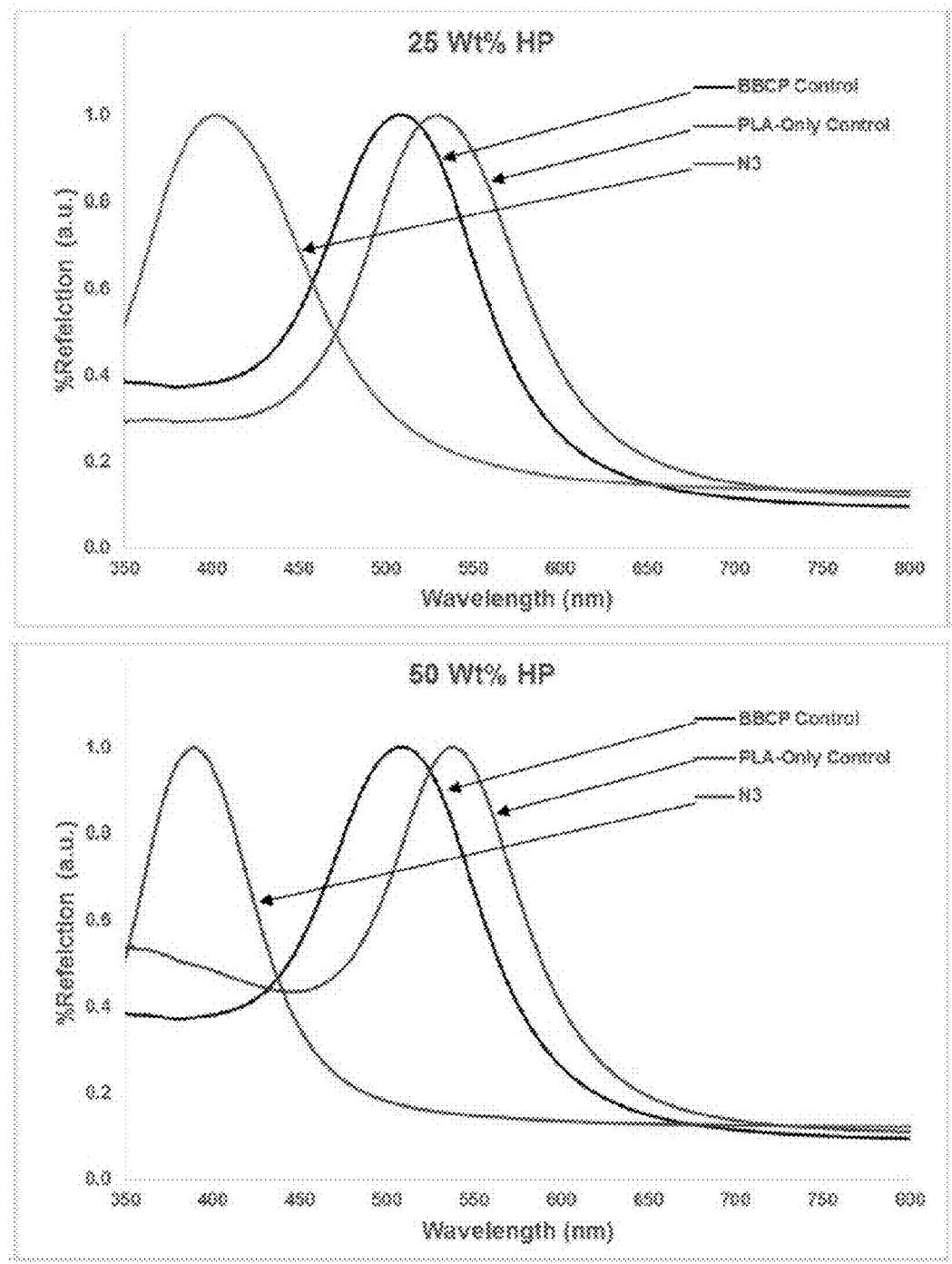
FIG. 18 shows UV-Vis spectra of P-S-N$_3$/BBCP Blends. Note that the total weight % of homopolymer is equal amounts RCP and PLA-HP. Samples in which the same amount of PLA-HP was added, but the RCP was not added are provided as controls for comparison.
Figure 19:
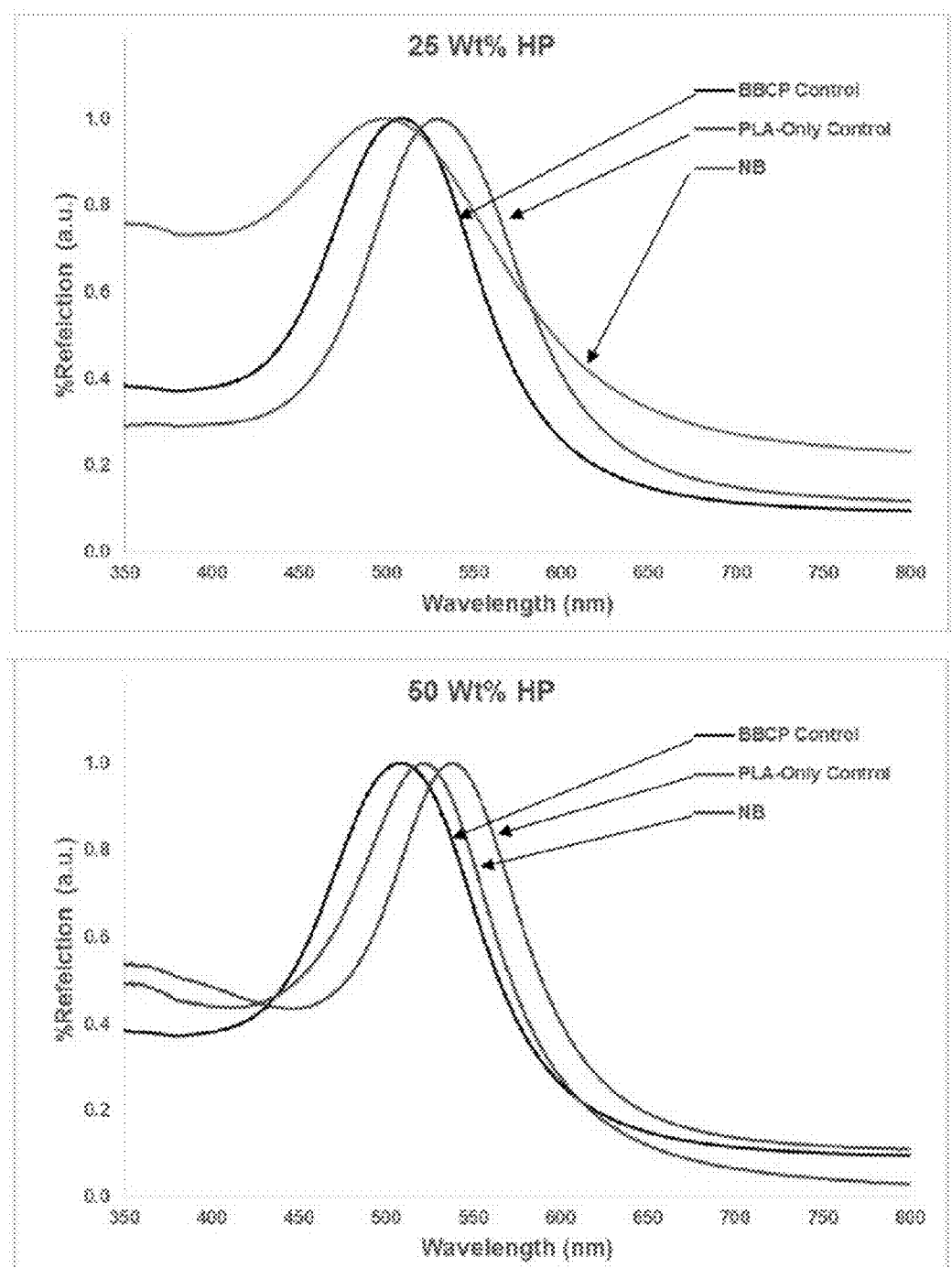
FIG. 19 to FIG. 23 show UV-Vis spectra of P-S-Norbornene/BBCP Blends; P-S-Nitrile/BBCP Blends; P-S-NH$_2$/BBCP Blends; P-S-MMA/BBCP Blends; and P-S-PPh$_3$/BBCP Blends, respectively. Note that the total weight % of homopolymer is equal amounts RCP and PLA-HP. Samples in which the same amount of PLA-HP was added, but the RCP was not added are provided as controls for comparison. In the P-S-PPh$_3$/BBCP Blends, no photonic gap was observed in the sample with 50 wt % PPh$_3$ HP and PLA-HP.
Figure 20:
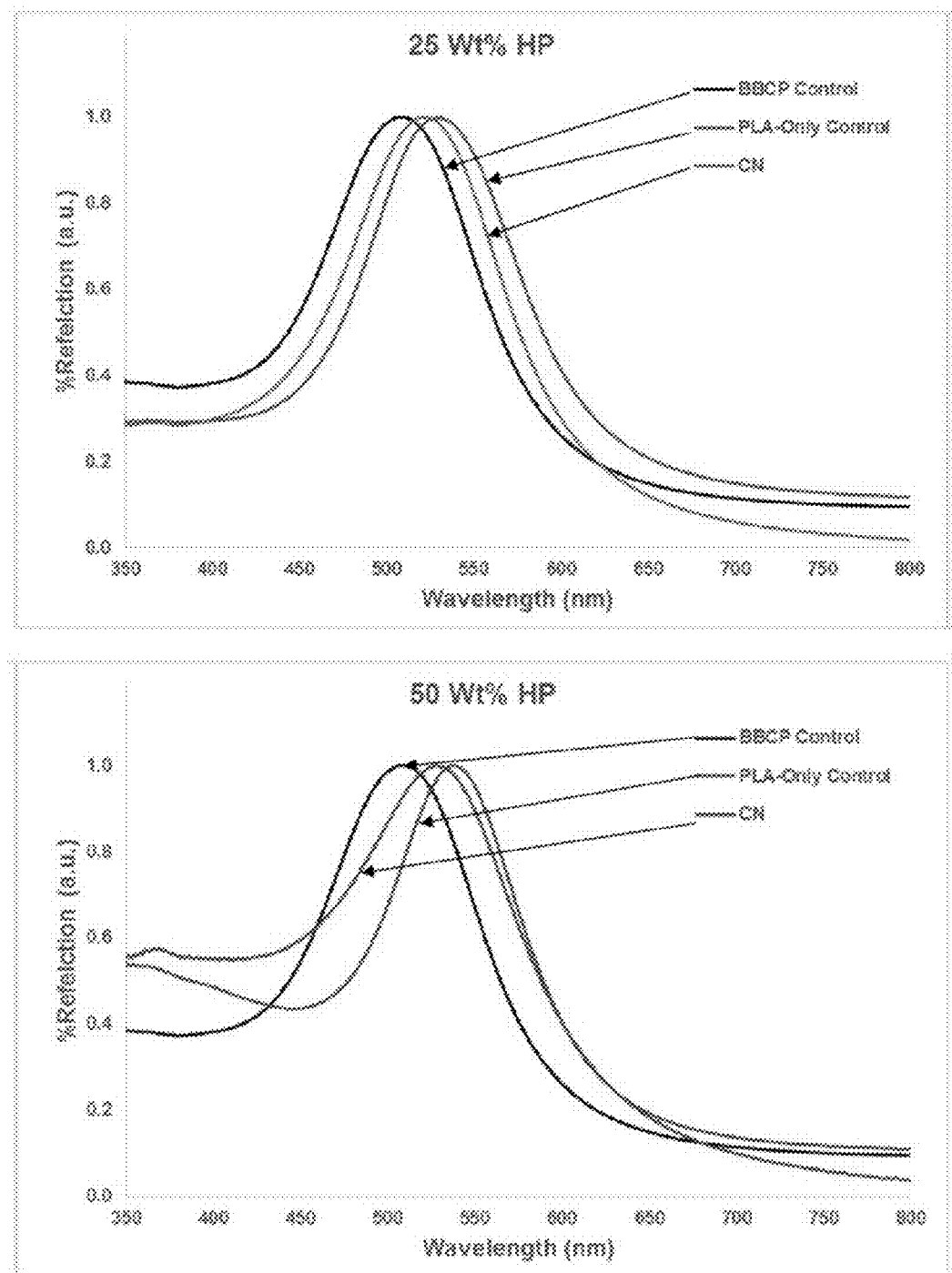
Figure 21:
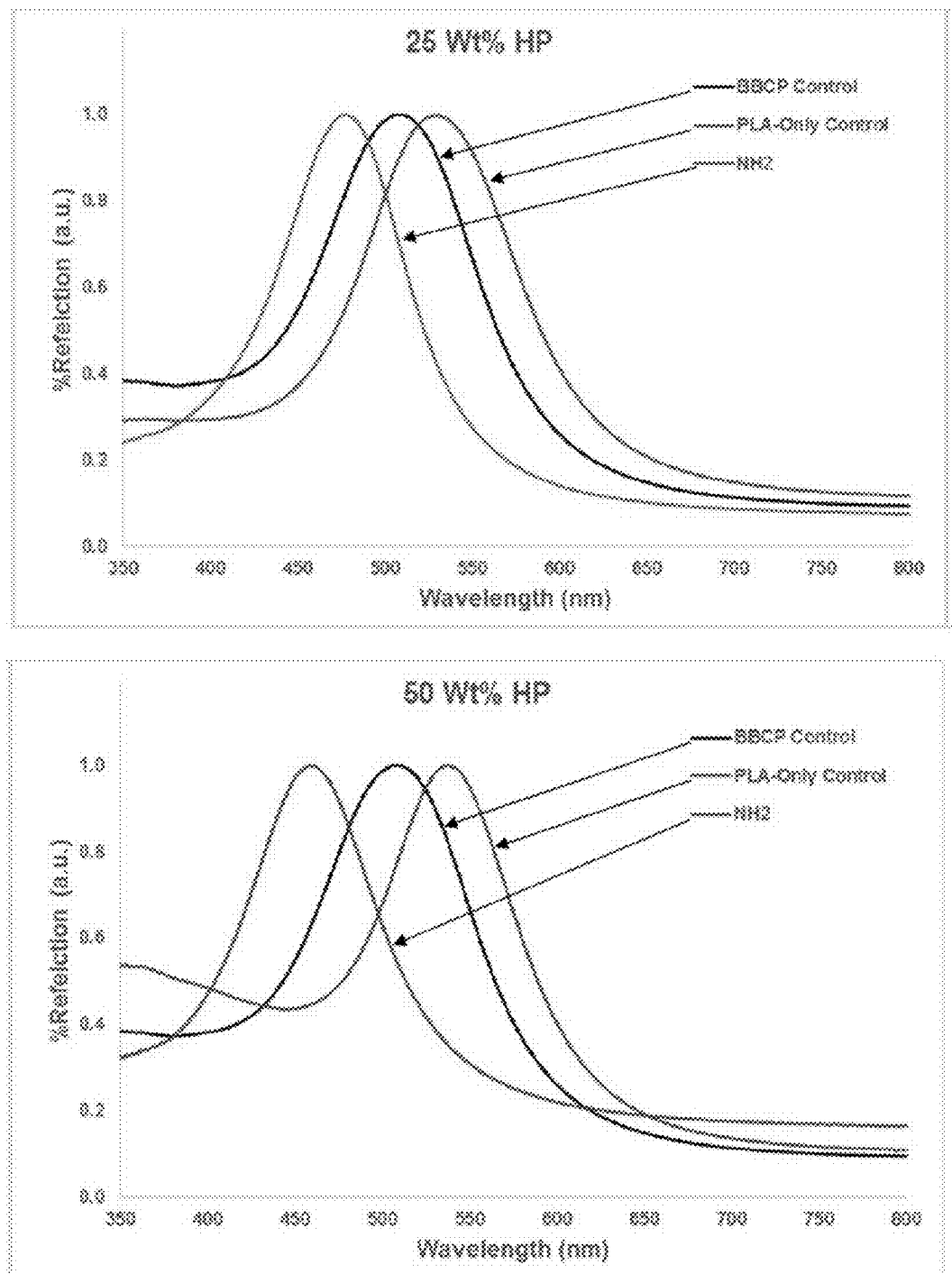
Figure 22:
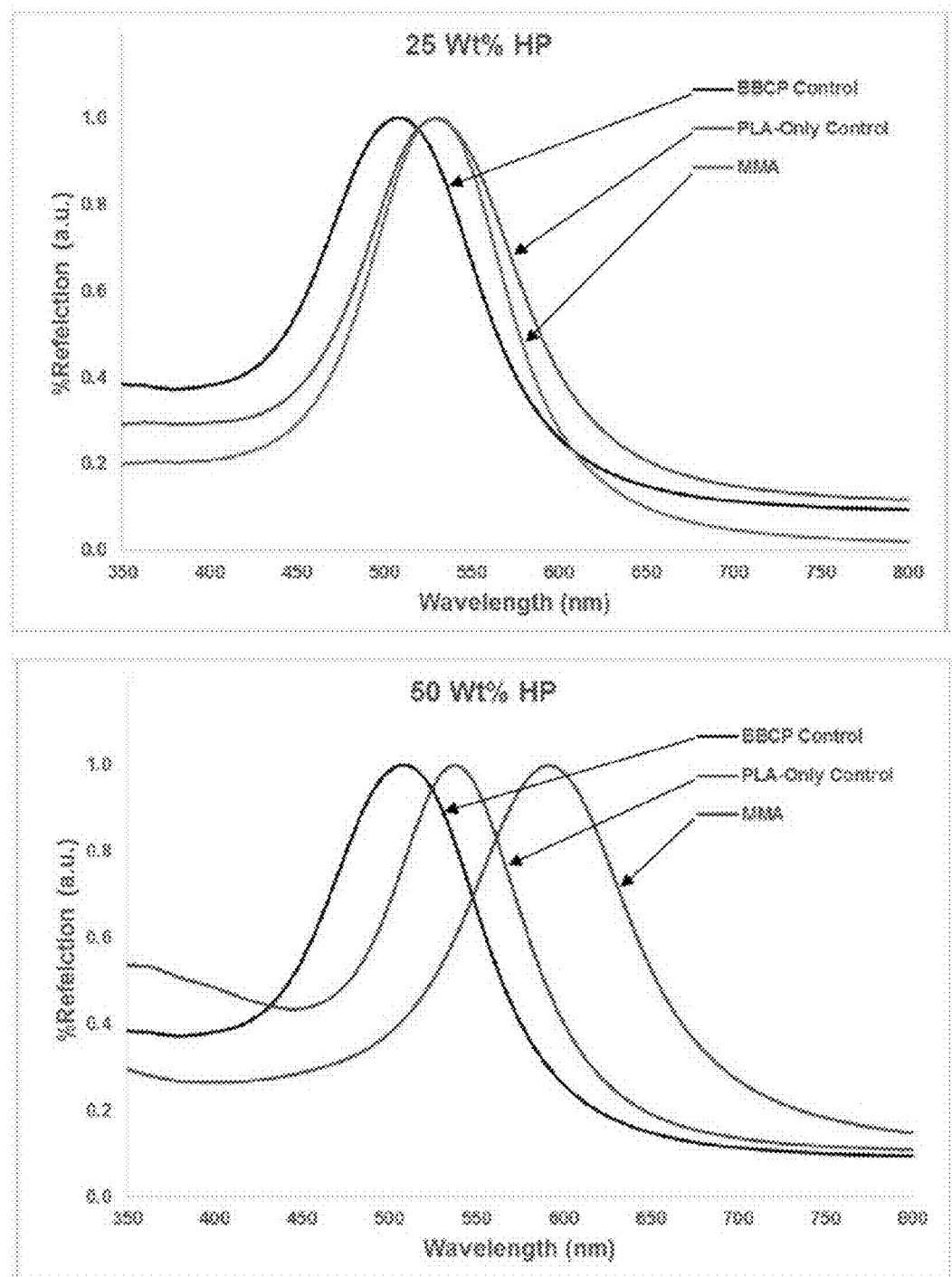
Figure 23:
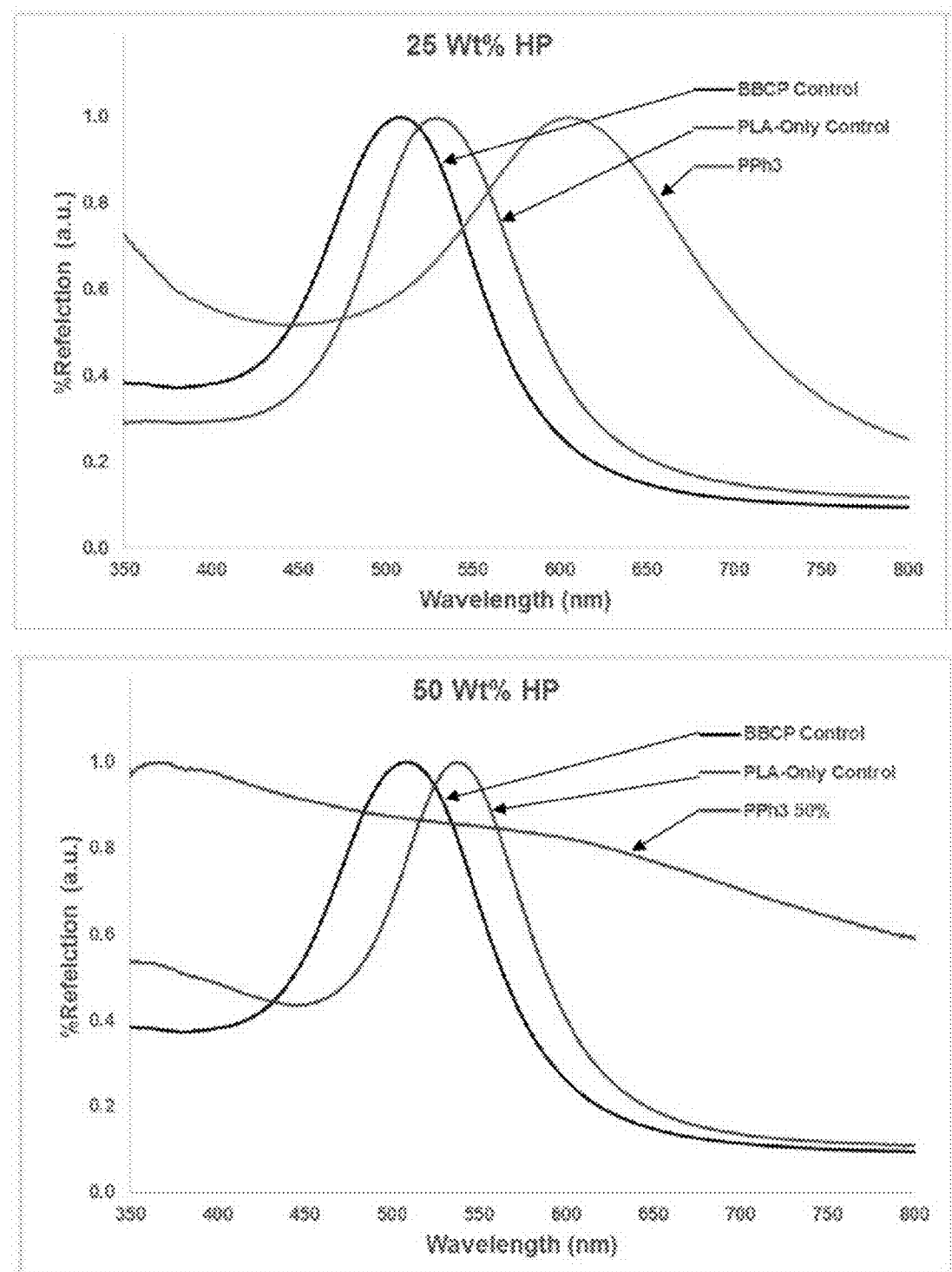
Figure 24:
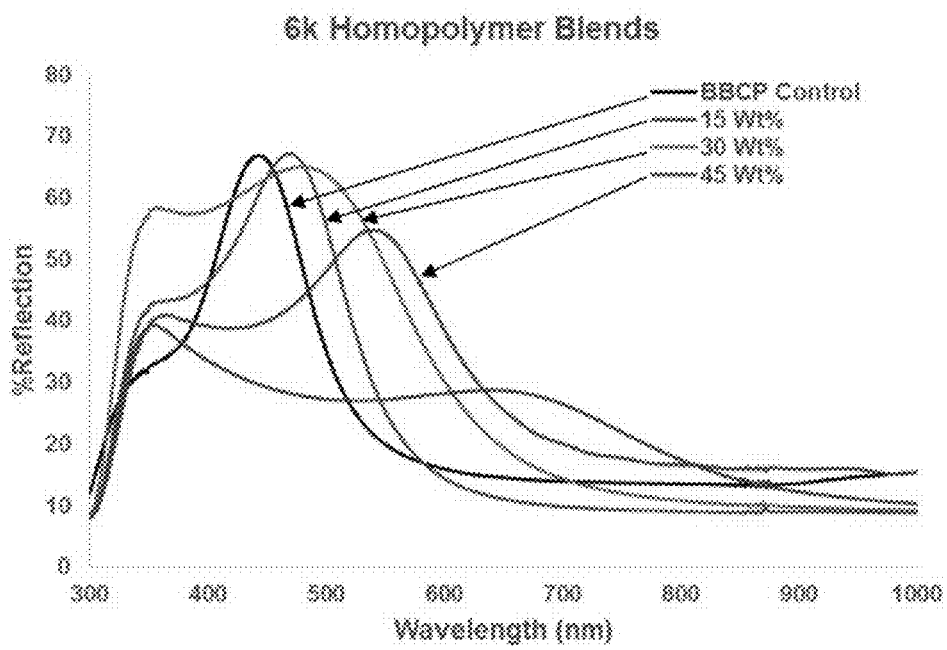
FIGS. 24 to 26 shows UV-Vis spectra of BBCP-6k HP Blends; BBCP-12k HP Blends; and BBCP-Brush HP Blends, respectively.
Figure 25:
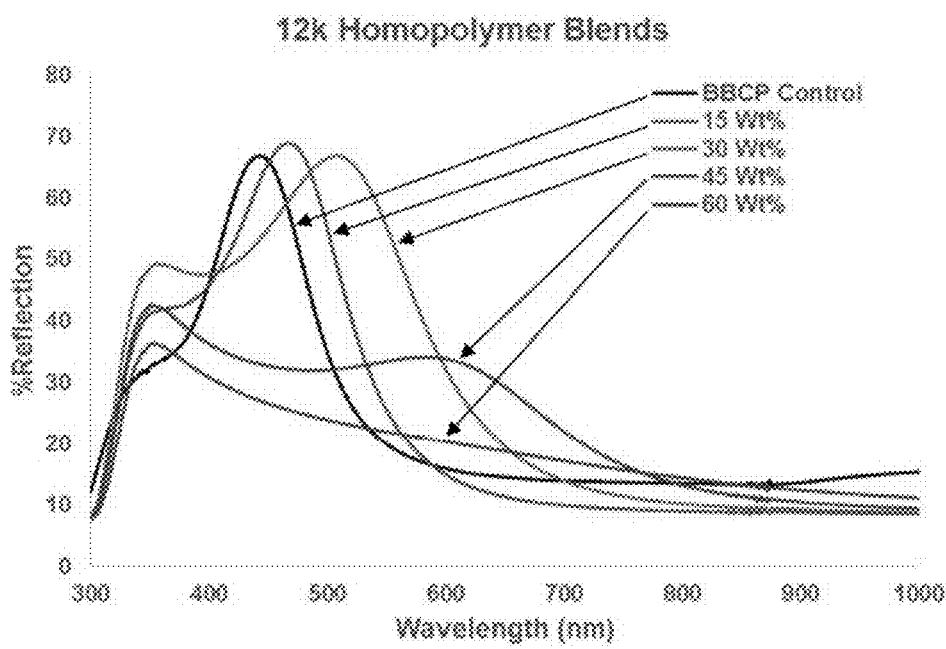
Figure 26:
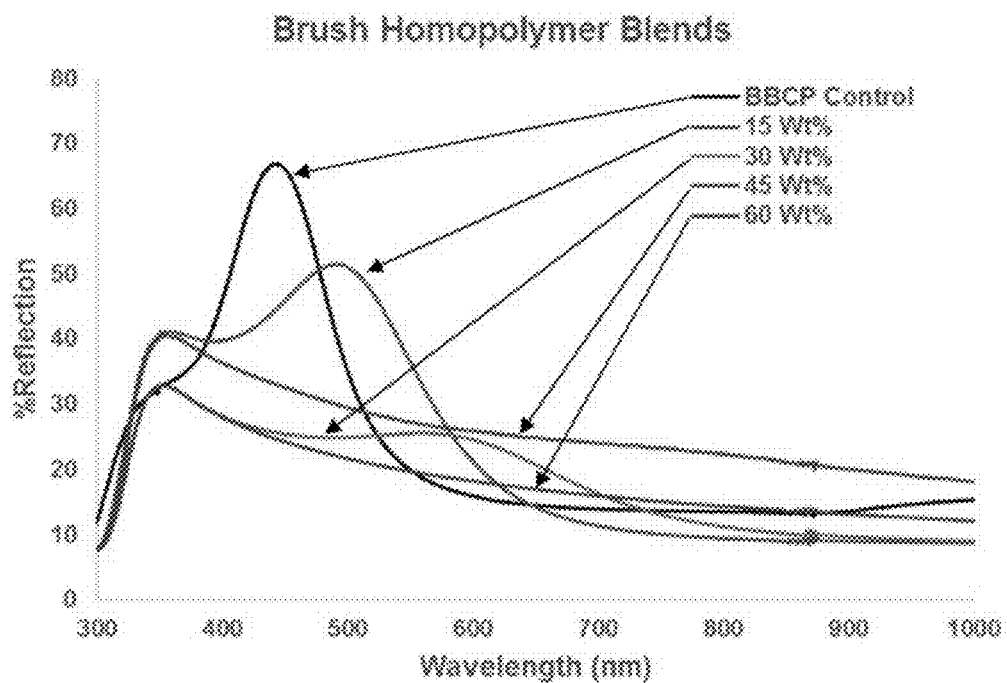
Figure 27:
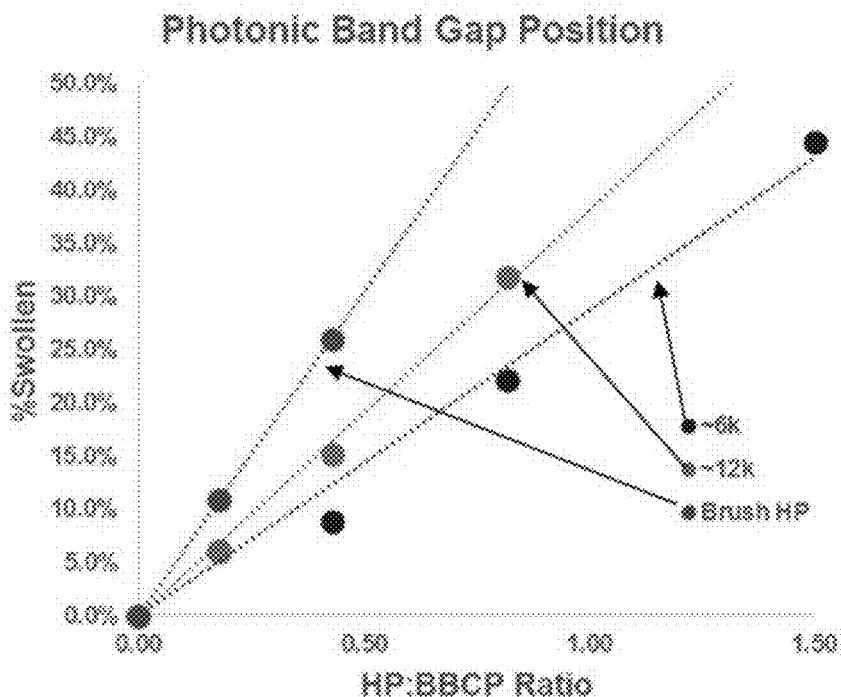
FIG. 27 shows photonic band gap position for BBCP/HP blends with different molecular weight HPs.
Figure 28:
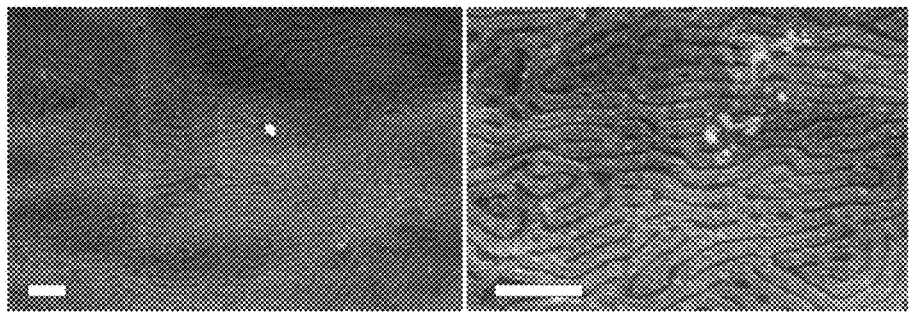
FIGS. 28 to 34 shows SEM Images of BBCP/P-S-VBzCl Blends, BBCP/P-S-N$_3$ Blends, BBCP/P-S-NB Blends, BBCP/P-S-CN Blends, BBCP/P-S-NH$_2$ Blends, BBCP/P-S-MMA Blends, and BBCP/P-S-PPh$_3$ Blends, respectively demonstrating that the structures are lamellar. In each case, the scale bars are 1 µm.
Figure 29:
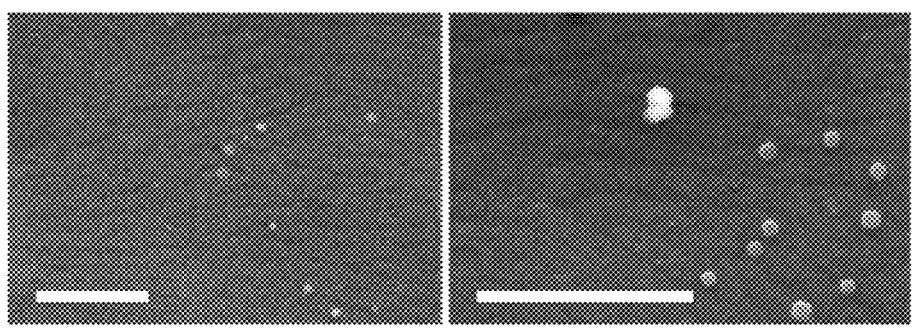
Figure 30:
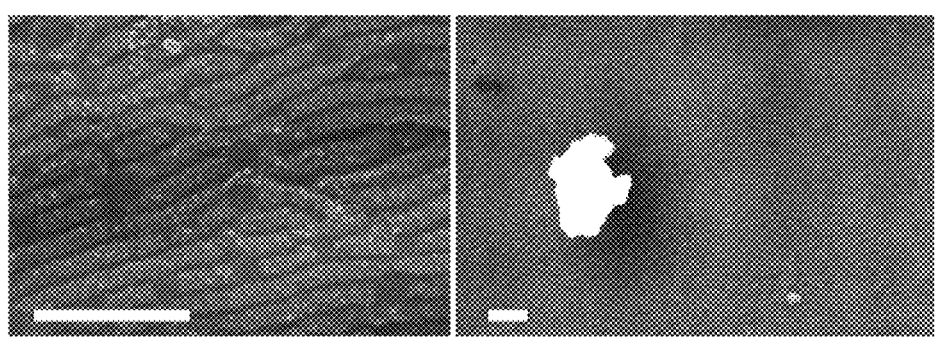
Figure 31:
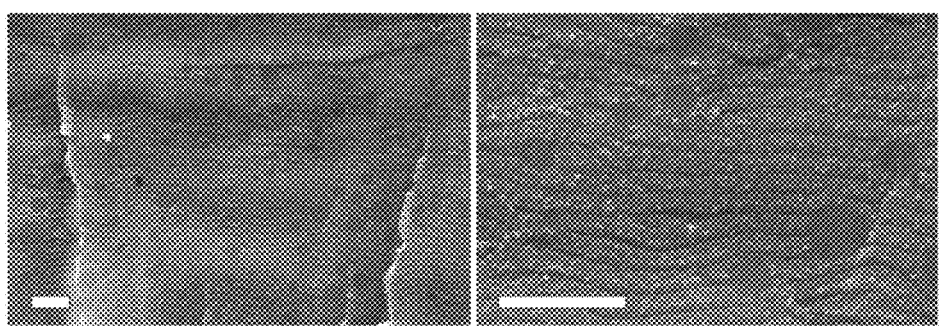
Figure 32:
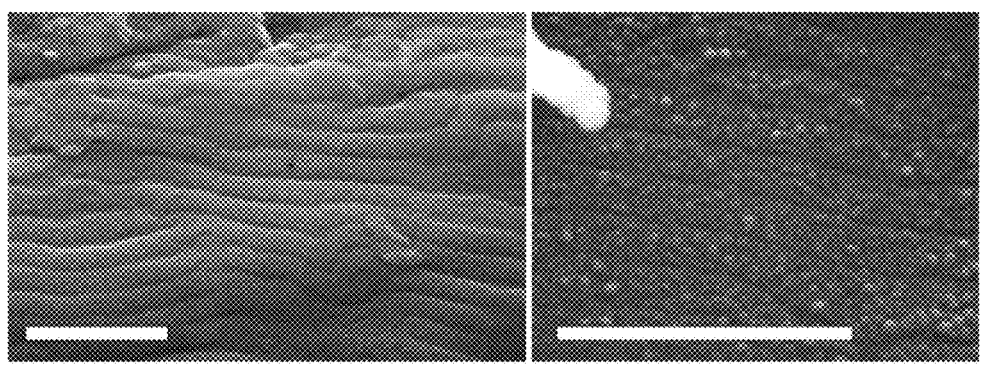
Figure 33:
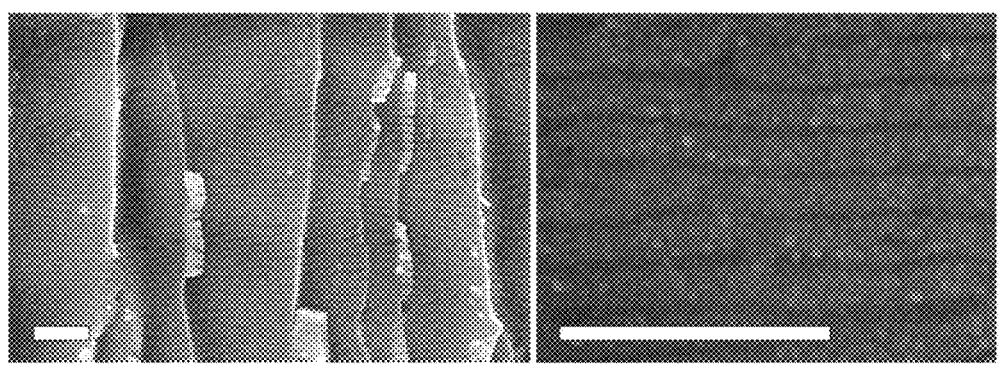
Figure 34:
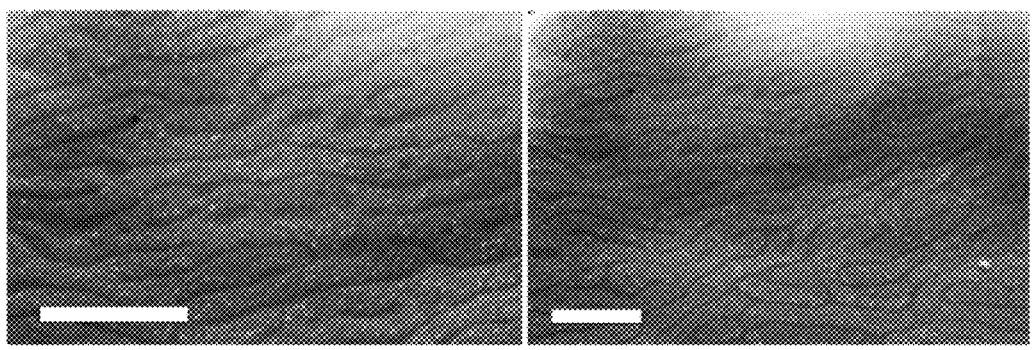

The first set of experiments described below examined if HPs could be used to swell the BBCPs in the same manner as their linear counterparts, and to what extent these homopolymers could change the domain spacing of the self-assembled arrays. All target BBCPs in this work were symmetric, containing roughly equivalent numbers of polystyrene (PS) and polylactic acid (PLA) macromolecular brushes (MW ~3.5 and ~3.1 kDa, respectively), and in all blends, the BBCPs were combined with equal amounts of PS and PLA homopolymers by weight. The initial blends used to test if HPs could controllably swell BBCP arrays utilized a BBCP of MW ~987 kDa and HPs that were of comparable weight (-3 kDa) to the BBCP brushes. All relevant polymer MWs and PDIs can be found in the Tables 1-4). These blends were annealed and the resulting films were characterized with UV-Vis reflectance measurements, electron microscopy (SEM), and small angle X-ray scattering (SAXS) to determine the quality and domain spacing of the self-assembled arrays (FIGS. 2, 5). Despite the relatively rigid nature of the BBCP, the incorporation of low MW HPs caused the arrays to swell up to ~140% of the periodicity of the non-blended BBCP (FIG. 2). Moreover, the relationship between periodicity and HP:BBCP weight ratio followed a linear trend up to 67.5 wt % HP (weight ratio of ~2:1), at which point the arrays shifted back to lower domain spacings, most likely indicating that the materials had begun to phase separate and the BBCP arrays could no longer tolerate added amounts of HP (FIGS. 2B, 5). Because the BBCPs and HPs exhibited significantly different rigidities and therefore assembly behaviors, self-consistent field theory was used to determine where the HPs were located within the BBCP arrays (FIG. 2C). The data showed that the HPs are dispersed evenly throughout each BBCP block, with only a slight preference for the center of the lamellae and the interface between two different blocks. As a result, the BBCPs were shown to tolerate the presence of a large degree of HP before phase segregation occurred, and thus the BBCPs can be swollen to a significant degree despite their relatively rigid nature.

Interestingly, the BBCP arrays did not lose any of the ideal self-assembly properties (fast kinetics of assembly, relatively narrow reflectance peak widths) even in blends consisting of greater than 2:1 HP:BBCP by weight. Higher MW HPs were also examined as additives and showed similar effects, but these heavier HPs also induced a greater amount of disorder in the arrays; see FIGS. 24-27. Blending low MW polymers with the BBCPs wass therefore the most ideal method to post-synthetically tune the lamellae domain spacing without the need to synthesize high MW BBCPs; this significantly increased the ease of generating these materials via ROMP, as lower MW BBCPs are often easier to synthesize with lower dispersity and better control over polymer quality.

To fully investigate the ability of these blends to control the domain spacing of the self-assembled arrays and thus the wavelength of reflected light, a series of BBCPs ranging from ~300 to ~900 overall DP (MW 987 to 3.035 kDa) were synthesized and blended with different amounts of ~3 kDa HPs. These BBCPs possessed backbone lengths commensurate with those of the BBCPs previously shown to give highly ordered arrays that reflect light ranging from the UV to the near IR (up to ~900 nm). Upon annealing the blends, three interesting observations can be made from examining their reflectance spectra (FIGS. 3, 6-16).

First, although the lowest MW BBCP examined previously could only be swollen to ~140% before the quality of the films decreased, higher MW BBCPs could be swollen to accommodate higher levels of HP, and also exhibited a greater degree of swelling with equivalent amounts of HP. The BBCPs could even be swollen to a periodicity that was 180% the value of the corresponding unblended BBCP (FIG. 3A); this increase in the extent to which heavier BBCPs could be swollen was most likely due to the lengths of these higher MW BBCPs being greater than their persistence length (and thus the larger BBCPs are entropically softer against deformations when compared to their shorter counterparts).

Figure 3A:
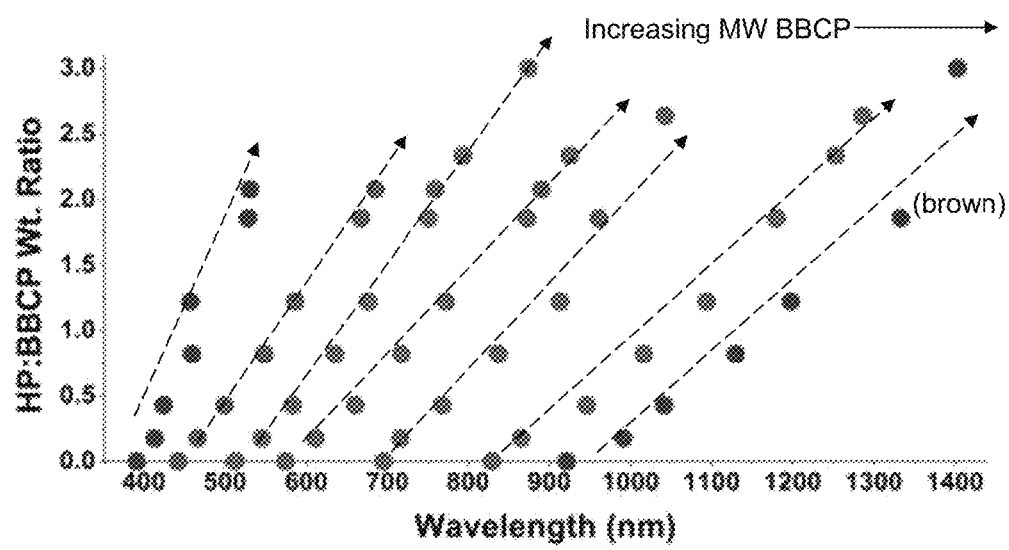
FIG. 3A shows that BBCP/HP Blends allow for the photonic band gap of the self-assembled arrays to be easily tuned from 390-1410 nm. Each color corresponds to a specific BBCP; some BBCPs could be swollen to ~180% of their initial domain spacing.
Figure 3B:
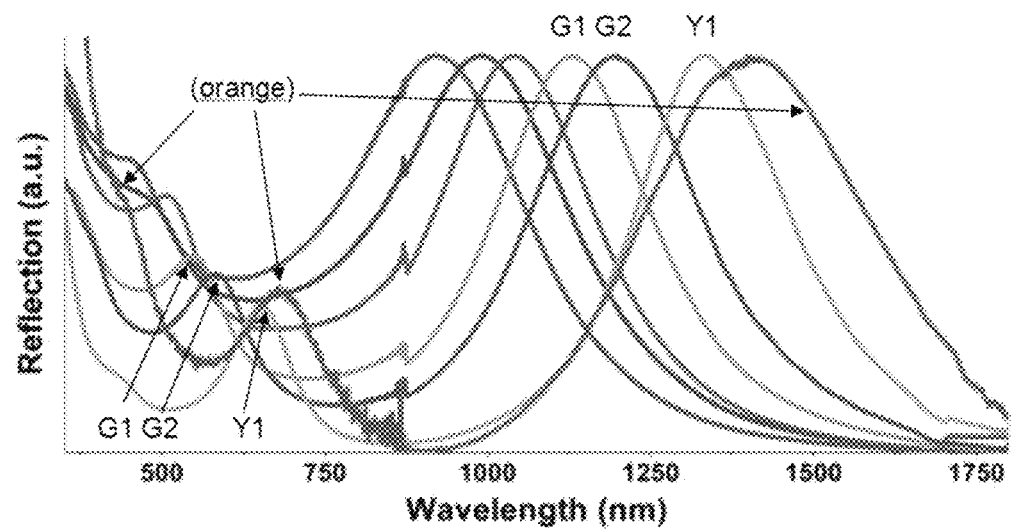
FIG. 3B shows UV-Vis spectra of the highest MW BBCP (brown circles in A) with increasing amounts of HP. Samples were well-ordered enough to observe higher order resonances at $\lambda/m$ (e.g. at ~625 nm (m=2) and ~450 (m=3) in the orange trace).

Secondly, the optical properties of the arrays noticeably improved when small to modest amounts of HP were added, especially in the case of the longest BBCPs (FIG. 3B). Specifically, the values of AU (a measurement of the full-width at half maximum of the peak relative to the peak maximum) narrowed, indicating greater homogeneity in lamellar periodicity. Additionally, the amount of opacity at wavelengths shorter than the photonic band gap decreased, indicating less uncontrolled scattering of light due to disordered regions of the sample. These phenomena can be explained by the fact that, although the ROMP process produced polymers with low dispersity, there is still some inherent polydispersity to the BBCP backbone lengths. The steric hindrance that the macromonomers impart to the BBCP made it difficult for the materials to accommodate these deviations and properly pack into perfectly ordered lamellae, generating strain in the BBCP backbone; the added HPs were able to fill in gaps between the BBCPs caused by inhomogeneities in BBCP backbone length. This hypothesis was supported by the simulation data that indicates the HPs are located throughout the entirety of the lamellar structure, and thus would be expected to easily alleviate the strain in the polymers resulting from their packing in non-ideal conformations.

Most importantly, adding HPs to the BBCP arrays allowed for significantly longer wavelengths of reflected light to be achieved than have been demonstrated previously (FIG. 3). Unblended PSPLA BBCPs have been shown to generate highly reflective films with λMax up to ~900 nm, generally with modest opacity in the visible range. In the present work, lamellar arrays that reflected light at ~1410 nm were readily synthesized, with almost no opacity in the visible. These materials were even well-ordered enough to observe second and third order harmonic reflectance peaks in some samples, indicating a degree of ordering within the materials that had not been previously achieved at these large periodicities.

While the HP/BBCP blends showed a clear advantage in generating materials with enhanced optical properties, they also presented another distinct advantage over non-blended BBCPs, specifically the incorporation of different functional groups into the BBCP arrays (FIG. 4). In principle, a random copolymer (RCP) composed predominantly of monomers identical to those in the BBCP macromonomers could provide a useful "Trojan horse" to bring pendant functional groups into the arrays without the need to directly attach them to the BBCPs, enabling their incorporation without the need to re-optimize the BBCP synthesis for each desired functionality. Such functional groups could be used to increase the utility of these films by allowing the incorporation of inorganic components that would alter the refractive index of a given block (thereby increasing reflectivity), providing a means to crosslink the films and increase their stability, or allowing the films to be dynamically altered or aligned with the application of external stimuli.

Figure 4A:
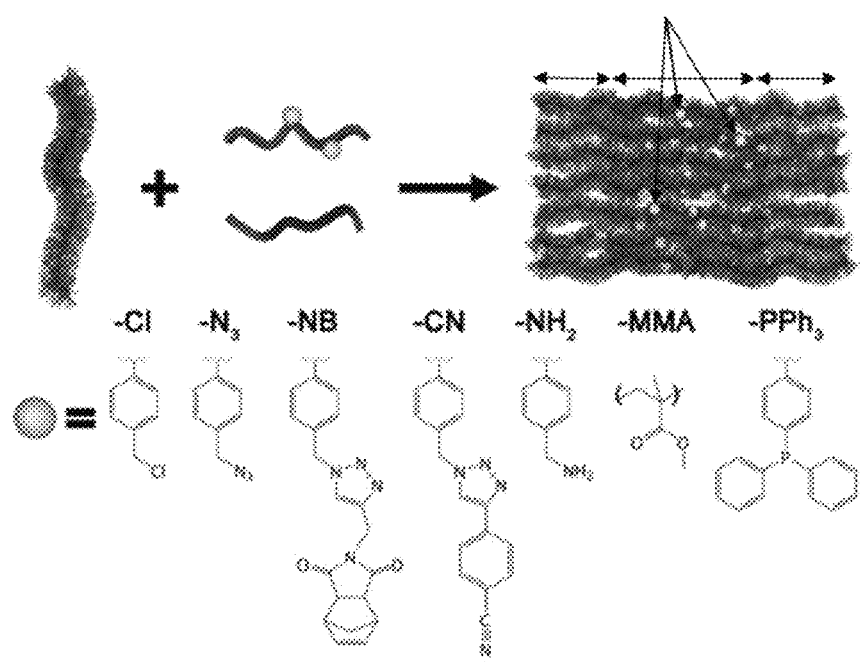
FIG. 4A shows that modifying a PS homopolymer with additional functional groups (yellow spheres) allows this random copolymer to act as a "Trojan horse" to bring these functional groups into the BBCP array.
Figure 4B:
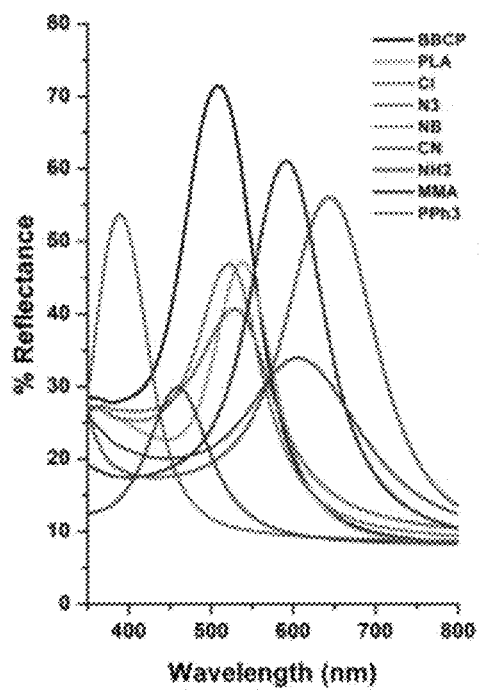
FIG. 4B (see Table 5) shows that all BBCP/RCP blends generated well-ordered arrays with clear photonic band gaps; the amount of reflection varied as a function of sample thickness and degree of disorder within the sample, but the quality of the lamellar arrays remained mostly unchanged.
Figure 4C:
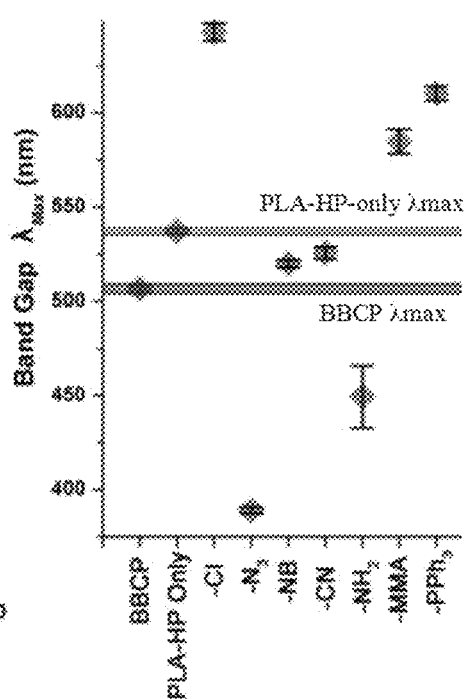
FIG. 4C shows that the photonic band gap $\lambda$max values (measured in triplicate) of the RCP blends did not overlap with either the BBCP $\lambda$max (blue lower region) or PLA-HP-only $\lambda$max (red upper region) controls, indicating that the RCPs were incorporated into the arrays. All blended samples contained ~25 wt % each PLA-HP and RCP, with the exception of the BBCP-only control, the PLA-only control (which contained the same amount of BBCP and PLA-HP as the others but no RCP), and PPh$_3$, which was 12.5 wt % each PLA-HP and RCP. As used herein, the acronyms BBCP and RCP refer to brush block copolymer and random co-polymer, respectively.

To test this hypothesis, an array of random copolymers (RCPs) was synthesized, consisting of styrene monomers and monomers containing additional functional groups (MW ~6-8 kDa, with ~10-25% incorporation of the various functional groups depending on the RCP; full details are listed in the FIGS. 17-23, Table 5). Functional groups with different sizes, polarities and reactivities were targeted, including moieties that are known to challenge or deactivate the metathesis polymerization catalyst (FIG. 4A). Importantly, these materials were able to generate reflective lamellar arrays at 25 and 50 wt % linear polymer (FIG. 4B), even in the presence of the following functional groups: benzyl chlorides, azides, tetrazoles, imides, norbornenes, nitriles, amines, esters, and phosphines. It should be noted that many of these functional groups (specifically norbornenes, nitriles, amines and phosphines) would either cause side reactions during metathesis polymerization, or deactivate the metathesis catalyst, thus preventing their direct incorporation into a BBCP. Although the specific location of the random copolymers within the array is challenging to determine, the photonic band gaps of all films were shifted both when compared to an unblended BBCP, as well as a control sample to which only the polylactic acid HP was added (FIG. 4C). This indicated that the presence of the RCPs was indeed affecting the domain spacing and thus must be incorporated within the lamellae in some manner. Additionally, complete phase segregation of the RCPs would likely result in large regions of disorder within the samples, significantly increasing the opacities of the films beyond what was observed via UV-Vis measurements; SEM also showed no evidence of large regions of phase segregated RCP (FIGS. 28-34). Finally, surface FTIR and NMR analyses confirmed that the functional groups were still present in the assembled films, even after the annealing and self-assembly processes (FIGS. 35-42).

Interestingly, while all of the blends still generated ordered arrays in the presence of RCPs, some of the materials resulted in swollen lamellae, while others actually resulted in a shrinking of the lamellar periodicity. Both SAXS and SEM imaging confirmed that the arrays still exhibit 1-D periodic morphologies and the changes in photonic band gap wavelength were due to changes in structure periodicity (as opposed to alterations to material refractive index, or a shift to 2-D or 3-D ordered morphologies) (FIGS. 28-34). One possibility that could explain the changes to lamellar periodicity for the RCP/BBCP blends was that the addition of different functional groups into the RCP changed the effective $\chi$ (a measure of polymer-polymer miscibility) between the RCP and BBCP components. SCFT simulations (FIGS. 43-47) for BBCP/RCP blends indicate that in films where the RCP-PLA $\chi$ is equal to or greater than the PS-PLA $\chi$, it always increases the periodicity of the lamellae, as stronger segregation between the PLA and RCP places the RCP in the center of the PS domains, separating the opposing PS blocks of the BBCPs. However, decreasing the PLA-RCP $\chi$ to values below the PS-PLA $\chi$ causes the RCP to segregate towards the interface between the PS and PLA blocks, resulting in a decrease of the overall lamellar spacing in order to alleviate strain in the system at the cost of more interfacial area.

In conclusion, blending linear HPs with BBCPs is a powerful means of synthesizing highly reflective polymer films with controlled periodicities up to about 600 to 600 nm, generating photonic band gaps at wavelengths as large as about 1750 nm. The addition of HPs to the BBCPs improved their overall ordering, thus improving the optical properties of the films, and also enabled the incorporation of functional groups into the arrays that might otherwise be difficult to attach to the BBCPs directly.

Example 1

Materials and Methods

Example 1.1. Materials: Unless otherwise noted, all solvents and reagents were purchased from VWR or Sigma-Aldrich. The ruthenium-based metathesis catalyst was obtained from Materia Inc. and stored in a drybox prior to use, and the $RuO_4$ SEM staining agent was obtained from Polysciences, Inc and stored at 4° C. The ruthenium metathesis catalyst (($H_2$IMes)(pyr)$_2$(Cl)$_2$RuCHPh) and PLA macromonomer initiator (N-(hydroxyethanyl)-cis-5-norbornene-exo-2,3-dicarboximide) were prepared as described in Sveinbjornsson, B. R., et al., *Proc. Natl. Acad. Sci. U.S.A.* 2012, 109, 14332. Dry solvents were purified by passing them through solvent purification columns, and 3,6-dimethyl-1,4-dioxane-2,5-dione was purified by sublimation under vacuum. All other solvents and chemicals were used without further purification unless otherwise noted.

Example 1.2. General Information: NMR spectra were recorded at room temperature on a Varian Inova 500 (at 500 MHz), and analyzed on MestReNova software. Gel permeation chromatography (GPC) was carried out in THF on two Plgel 10 µm mixed-B LS columns (Polymer Laboratories) connected in series with a miniDAWN TREOS multiangle laser light scattering (MALLS) detector, a ViscoStar viscometer and Optilab rex differential refractometer (all from Wyatt Technology). The do/dc values used for the polylactide and polystyrene macromonomers were 0.050 and 0.180 respectively, and do/dc values for the brush polymers and random copolymers were obtained for each injection by assuming 100% mass elution from the columns. SEM images were taken on a ZEISS 1550 VP Field Emission SEM, and reflection measurements were performed on a Cary 5000 UV/Vis/NIR spectrophotometer, equipped with an 'integrating sphere' diffuse reflectance accessory (Internal DRA 1800); all reflection measurements were referenced to a LabSphere Spectralon 99% certified reflectance standard. The samples were illuminated through a Spectralon-coated aperature with a diameter of 1 cm, with a beam area of approximately 0.5 $cm^2$. The samples were scanned at a rate of 600 nm/min with a 1 nm data interval, with detector crossover (InGaAs to PMT) at 875 nm. SAXS Data was collected at beamline 12-ID at Argonne National Laboratory's Advanced Photon Source. The samples were probed using 12 keV (1.033 Å) x-rays, and the sample-to-detector distance was calibrated from a silver behenate standard. The beam was collimated using two sets of slits and a pinhole was used to remove parasitic scattering. The beamwidth was approximately 200-300 µm horizontally and 50 µm vertically.

Importantly, samples obtained by annealing the polymer blends between two glass coverslips that were scanned with the X-ray beam perpendicular to the substrate did not yield meaningful data in most systems. This was taken as a strong indication that the samples were all highly aligned in a direction parallel to the substrate—very few samples showed any meaningful data, and then only giving very weak signal, despite the large degree of reflectivity observed in the optical data. This was confirmed by aligning the substrates parallel to the X-ray beam and scanning through the entirety of a sample. In this arrangement, multiple scattering peaks could be observed for most systems. However, due to the small film thickness, scattering from the substrate or glass coverslips was unavoidable and contributed significantly to the background noise. As a result, while the samples clearly had ordered lamellae as confirmed by SEM and optical spectroscopy, not all samples were able to be properly characterized with SAXS, especially samples with large periodicities where the q0 scattering peak was obscured by the substrate scattering. As a result, lamellar spacings were not obtainable for all systems and thus some values were instead inferred from the optical data by comparing the photonic band gaps of systems where SAXS data was obtained to the SAXS lamellar spacings.

Example 1.3. Methods: The synthesis and characterization of macromonomers, brush block copolymers, and brush homopolymers was performed as described previously. Polystyrene and polylactic acid homopolymers were synthesized using the same protocols, and the polystyrene homopolymers were synthesized with the same protocol but using methyl α-bromoisobutyrate as an initiator.

Random copolymers were synthesized using a protocol modified from Maher, M. J., et al., *Chem. Mater.* 2014, 26, 1471. The random copolymers containing vinylbenzyl chloride, methyl methacrylate, and 4-(diphenylphosphino)styrene monomers were synthesized directly, while the random copolymers bearing azide, amine, olefin, and nitrile groups were synthesized via modification of the vinylbenzyl chloride-styrene random copolymer.

To generate the directly synthesized random copolymers, AIBN was first recrystallized from hot methanol, then filtered and placed under vacuum to remove excess solvent. Styrene, vinylbenzyl chloride, and methylmethacrylate were mixed with basic aluminum oxide and stirred for 30 minutes to remove the stablizing agents present in solution that would impede polymerization, then filtered through a glass frit; vinylbenzylchloride was subsequently passed through plugs of basic alumina (typically two purifications were sufficient) to yield a colorless solution. 4-(diphyenylphosphino)styrene was used as a solid powder with no further purification.

In a typical synthesis, styrene (14.85 ml, 1 equiv.), vinylbenzylchloride (4.5 ml, 0.25 equiv.), AIBN (6.75 g, 0.32 equiv.) and THF (54 mL) were combined in a two-necked round bottom flask fitted with a rubber septum and a condenser column, then degassed with Argon for about 1 hour. The solution was then placed at 65 ° C. for 1 hour; conversion was kept low in order to prevent monomer drift. The polymer solution was then cooled in an ice bath and dried on a rotary evaporator to remove the THF. The remaining solution was precipitated in methanol 3 times to remove excess monomer, then dried under vacuum. GPC and NMR were used to determine molecular weights and relative monomer fractions within the RCPs.

The azide-bearing RCPs were synthesized by reacting the vinylbenzyl chloride RCP (4.52 g, 1 equiv.) with sodium azide (0.882 g, ~1.5 equiv. per —Cl group) in DMF (75 mL) at room temperature overnight; this sample was purified via three precipitations in methanol. Complete conversion was noted by H NMR in accordance with previous protocols (3). The amine-bearing RCP was synthesized by reacting the azide-RCP (0.519 g, 1 equiv.) with triphenyl phosphine (1.15 g, ~6 equiv.) in a 10:1 mixture of THF and H2O (30 mL, 3 mL, respectively) at room temperature for 24 hours (4). Purification was performed by extraction from cold ether.

Click chemistry was used to synthesize the olefin- and nitrile-RCPs; the azide RCP (0.268 g, 1 equiv.) was combined with either 4-ethynylbenoznitrile (0.111 g, ~1.5 equiv. per $N_3$ group) or N-(propargyl)-cis-5-norbornene-exo-2,3-dicarboximide (0.179 g, ~1.5 equiv. per $N_3$ group, synthesized using protocols described previously (1)), and with CuBr (35 mg, ~0.4 equiv.), and PMDETA (50 µL, ~0.4 equiv.). This mixture was then dissolved in ~15 mL degassed THF, and the solution was further degassed for ~15 minutes, then placed at 65° C. overnight. The reaction mixture was purified by filtering through a basic alumina column followed by two rounds of precipitation in methanol. For all of the above polymers, molecular weights were confirmed using GPC, and complete conversion of the starting material was observed via shift of the H NMR peak corresponding to the protons geminal to the chloride/azide/amine/"clicked" triazole groups.

Blends were prepared by dissolving BBCPs and HPs in benzene to generate stock solutions at known concentrations. These solutions were then mixed in 20 ml scintillations vials at appropriate concentrations and flash frozen via submersion in liquid nitrogen. Once the samples were fully frozen, they were placed in a vacuum chamber and pumped down to ~200 mbar, then allowed to heat up to room temperature overnight, resulting in fluffy white powders that were a homogenous mixtures of all polymer components.

Lamellar arrays of BBCPs were synthesized by placing the powdered blends in between two substrates (glass slides for reflection and SEM measurements, a Si wafer and a glass coverslip sandwiched between two glass slides for SAXS and IR) and compressed with clamps. Samples were annealed by placing them in a 140° C. oven under vacuum overnight, then allowing them to cool in air. For reflection measurements, the glass slides were left intact—some measurements were also performed by separating the two glass slides sandwiching the polymer and measuring reflectance from the polymer film on a single glass slide, but no difference was noted in the photonic band gap $\lambda_{Max}$. Glass slides coated in polymer films that were characterized with SEM were first fractured to expose a polymer surface perpendicular to the glass slides, then stained with fresh $RuO_4$ vapor for ~8 minutes and coated with ~10 nm of amorphous carbon to allow for SEM contrast and to prevent charging, respectively. Samples prepared on Si wafers for SAXS and IR were separated from the coverslip prior to taking measurements.

Example 1.4 Modeling Information: Self-Consistent Field Theory (SCFT) was utilized to model systems with bottle brush block copolymers by extending the grafted copolymer melt model (5) with a multi-species exchange model. A polynorbornene backbone (A) was grafted evenly with constant grafting density by PS side-arms (B) and PLA side-arms (C). The grafting density is defined as: $\tau_{K+1}/(k+1)$ where k is the number of B arms and l is the number of C arms. The position of each grafted arm, $\tau_j$ can be calculated from Wang et al (*Langmuir* 2009, 25(8), 4735-4742) as:

$$\tau_j = \tau_o + (j-1)(1-\tau_1)/(k+l) \quad 1 \le j \le k+l$$

To match the experimental conditions, $\chi BC\, N$ is 12.0, as calculated from the length of homopolymer PS and PLA, and $\chi$ and N (the degree of polymerization) are calculated from Zalusky, et al., *J. Am. Chem. Soc.*, 2002, 124, 12761. Additionally, $\chi AB\, N = \chi AC\, N = 0$, where the segregation strength of the polynorbornene backbone and all other sidearms are effectively shielded by the high grafting density. This parameterization represents a bottle brush block copolymer of PS and PLA grafted arms with molecular weight equal to 987 kg/mol when the backbone length $\alpha A$ is set to 2.8 and the number of grafted brushes is 140 each of PS and PLA arms. From this parameter setup, the period of lamellar morphology in the bulk is calculated in Rg units, where $1R_g = 7.1$ nm.

Example 2

Supplementary Data

Example 2.1 List of Polymer Information

TABLE 1

Macromonomer Physical Data

| MM ID | MW (g/mol) | PDI | DP |
|---|---|---|---|
| PLA-MM | 3100 | 1.113 | 40 |
| PS-MM | 3500 | 1.019 | 31 |

TABLE 2

Brush Block Copolymer Physical Data

| BBCP ID | MW (g/mol) | PDI | $f_{PS}/f_{PLA}$ | $DP_{PS}$ | $DP_{PLA}$ |
|---|---|---|---|---|---|
| A | 987000 | 1.024 | 52/48 | 155 | 143 |
| B | 1406000 | 1.010 | 51/49 | 217 | 209 |
| C | 1517000 | 1.015 | 50/50 | 230 | 230 |
| D | 1763000 | 1.019 | 50/50 | 267 | 267 |
| E | 2110000 | 1.038 | 50/50 | 320 | 320 |
| F | 2648000 | 1.051 | 50/50 | 401 | 401 |
| G | 3035000 | 1.053 | 51/50 | 460 | 460 |

TABLE 3

Homopolymer Physical Data

| HP ID | MW (g/mol) | PDI | DP |
|---|---|---|---|
| PS-3k | 3200 | 1.056 | 42 |
| PS-6k | 6200 | 1.037 | 83 |
| PS-12k | 12400 | 1.038 | 169 |
| Brush PS | 139000 | 1.003 | 45 |
| PLA-3k | 3100 | 1.286 | 27 |
| PLA-6k | 6700 | 1.244 | 62 |
| PLA-12k | 13900 | 1.396 | 133 |
| Brush PLA | 151000 | 1.006 | 43 |

TABLE 4

Random Copolymer Physical Data

| RCP ID | MW (g/mol) | PDI | $f_{P-X}$ | DP |
|---|---|---|---|---|
| P-S-VBzCl | 5200 | 1.163 | 24.4 | 45 |
| P-S-$N_3$ | 5770 | 1.140 | 24.0 | 44 |
| P-S-NB | 8010 | 1.199 | 18.2 | 56 |
| P-S-CN | 7140 | 1.144 | 26.9 | 46 |
| P-S-$NH_2$ | 6500 | 1.154 | 7.7 | 50 |
| P-S-MMA | 5210 | 1.115 | 29.6 | 52 |
| P-S-$PPh_3$ | 6520 | 1.508 | 16.9 | 49 |

Brush Block Copolymer Blend Photonic Band Gap and Lamellar Spacing Data are shown in FIG. 5. The *dLam for each sample was calculated using small angle X-ray scattering. Values noted with a star could not be measured directly and thus were interpolated based upon the photonic band gap position and the directly measured dLam values for other BBCP blends.

TABLE 5

Block Copolymer Random Copolymer Blend Information. Note that the PLA-Only blend contained amounts of BBCP and PLA-HP that were equivalent to the other blends; because there was no RCP added, the overall weight percent values are different.

| Blend System | Wt % RCP + HP | $\lambda_{Max}$ (nm) | % Shifted |
|---|---|---|---|
| BBCP C | 0.0% | 512 | — |
| PLA-Only | 14.2% | 529 | 3.32% |
| PLA-Only | 33.3% | 527 | 2.93% |
| P-S-VBzCl | 25.0% | 561 | 9.64% |
| P-S-VBzCl | 50.0% | 643 | 25.6% |
| P-S-N$_3$ | 25.0% | 400 | −21.9% |
| P-S-N$_3$ | 50.0% | 389 | −24.0% |
| P-S-NB | 25.0% | 494 | −3.52% |
| P-S-NB | 50.0% | 520 | 1.56% |
| P-S-CN | 25.0% | 523 | 2.21% |
| P-S-CN | 50.0% | 526 | 2.67% |
| P-S-NH$_2$ | 25.0% | 477 | −6.84% |
| P-S-NH$_2$ | 50.0% | 449 | −12.2% |
| P-S-MMA | 25.0% | 534 | 4.36% |
| P-S-MMA | 50.0% | 585 | 14.2% |
| P-S-PPh$_3$ | 25.0% | 610 | 19.2% |
| P-S-PPh$_3$ | 50.0% | — | — |

Example 2.2. Polymer Blends with Different MW HPs: The effects of changing HP MW on the periodicity were also examined, as it has been shown in linear HP/BCP blends that the altering the weight of the homopolymer added to a blend can effect different amounts of swelling. To this end, BBCPs (MW ~1,406,000 g/mol) were blended with HPs that were 2× and 4× larger (~6,000 g/mol and ~12,000 g/mol, respectively) than the BBCP brushes, as well as PS and PLA homobrush polymers with a MW ~45 times that of the macromolecular brushes (~150,000 g/mol). In these systems, increasing the MW of the HP resulted in a greater change in periodicity with increasing HP wt %, but at the cost of decreased ordering, resulting in poorer quality photonic bandgaps—the significant opacity and lack of a band gap in higher HP wt % films indicates that the blends are no longer capable of forming ordered lamellar arrays.

The modeling data for these systems showed that the larger the HP MW, the greater its segmentation to the regions in the center of the lamellae, in between different layers of BBCPs. This greater degree of segregation explains both the larger change in periodicity for heavier HPs (as they contribute more to expansion of the lamellae), as well as the limited tolerance of the BBCP arrays for the heavier HPs before phase segregation occurs.

Example 2.2.1. UV-Vis spectra for the various HP blends are provided in FIGS. 25 and 26.

Example 2.2.2. Photonic band gap position data for the various HP blends are provided in FIG. 27.

Example 2.2.3. SEM data for the various RCP blends are provided in FIGS. 28 to 34.

Figure 35A:
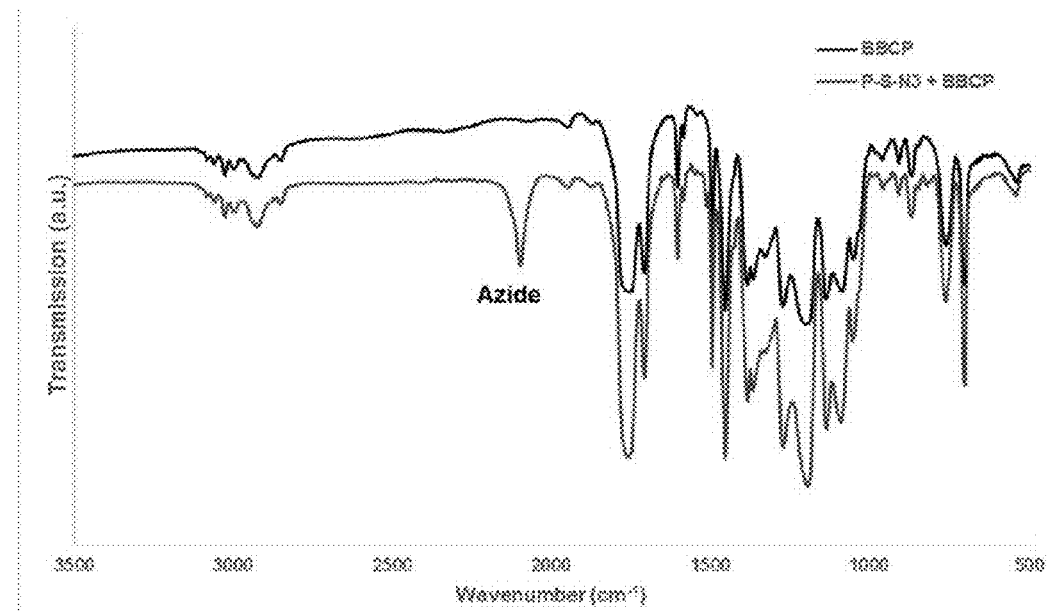
FIGS. 35A and 35B show IR data of unblended polymer films (black upper traces) and BBCP films with azide- and nitrile-functionalized random copolymers (red lower traces). Other RCPs were analyzed with IR as well, but the relatively small amount of functional group compared to the BBCPs, as well as the lack of a distinct, unobscured peak that was diagnostic of the RCP in question prevented complete analysis with IR. NMR data (below) was therefore also used to confirm the presence of the additional functional groups.
Figure 35B:
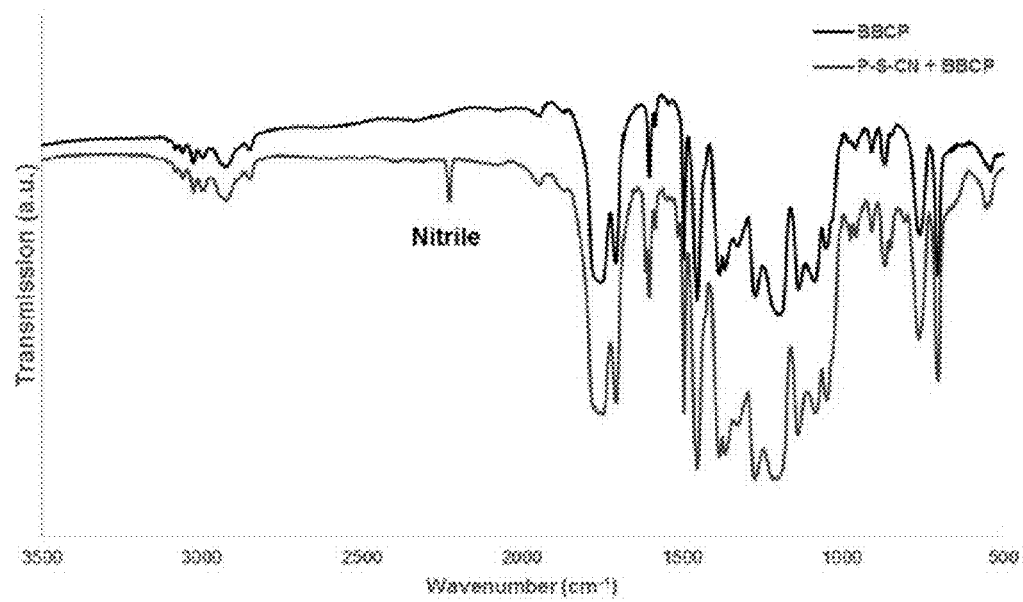
Figure 36:
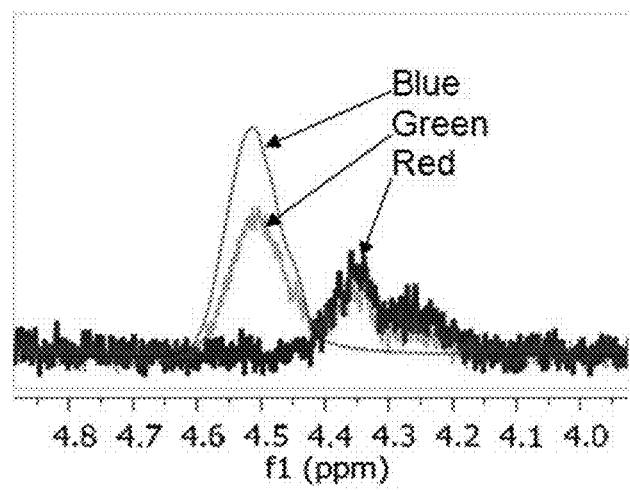
FIG. 36 provides $^1$H NMR overlay of the P-S-VBzCl RCP (blue upper trace), the BBCP-PLA MM blend control (red lower trace), and the recovered BBCP/RCP blend (green middle trace), showing that both the BBCP and the RCP functional groups were present in the blend. The peak at 4.5 ppm corresponds to the protons geminal to the chloride group.
Figure 37:
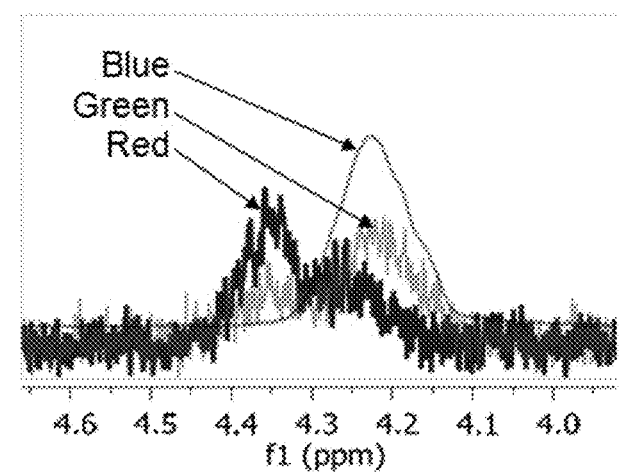
FIG. 37: provides $^1$H NMR overlay of the P-S-N$_3$ RCP (blue trace), the BBCP-PLA MM blend control (red trace), and the recovered BBCP/RCP blend (green trace), showing that both the BBCP and the RCP functional groups were present in the blend. The peak at 4.2 ppm corresponds to the protons geminal to the azide group.
Figure 38:
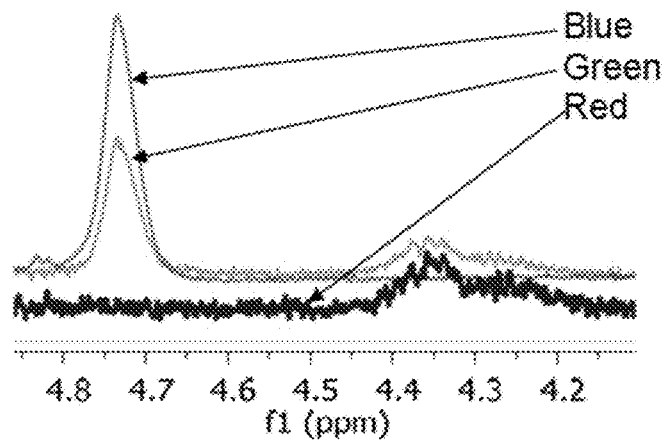
FIG. 38 provides $^1$H NMR overlay of the P-S-NB RCP (blue trace), the BBCP-PLA MM blend control (red trace), and the recovered BBCP/RCP blend (green trace), showing that both the BBCP and the RCP functional groups were present in the blend. The peak at 4.75 ppm corresponds to the protons geminal to the "clicked" triazole group.
Figure 39:
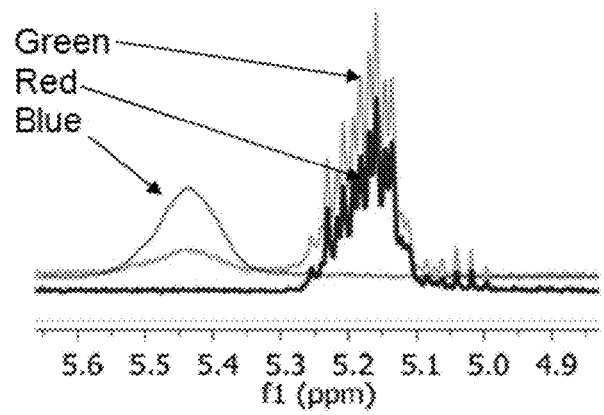
FIG. 39 provides $^1$H NMR overlay of the P-S-CN RCP (blue trace), the BBCP-PLA MM blend control (red trace), and the recovered BBCP/RCP blend (green trace), showing that both the BBCP and the RCP functional groups were present in the blend. The peak at 4.75 ppm corresponds to the protons geminal to the "clicked" triazole group.
Figure 40:
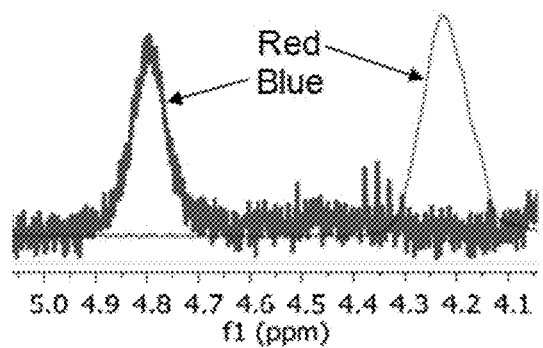
FIG. 40 provides $^1$H NMR overlay of the P-S-NH$_2$ RCP geminal peak (blue trace) and the P-SN$_3$ RCP used to synthesize the P-S-NH$_2$ RCP's geminal peak (red trace), indicating that the starting material was completely converted to the desired product.
Figure 41:
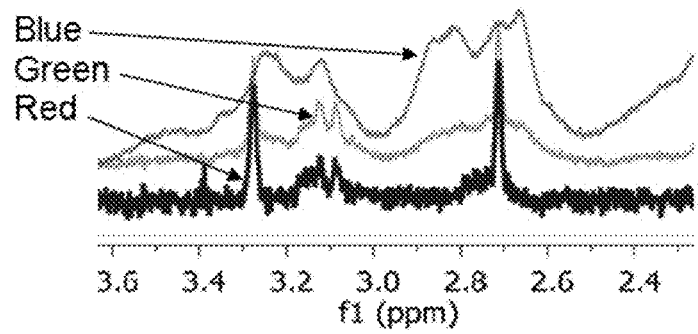
FIG. 41: provides partial $^1$H NMR overlay of the PS-MMA RCP (blue trace), the BCP-PLA MM blend control (red trace), and the recovered BBCP/RCP blend (green trace), showing that both the BBCP and the RCP functional groups were present in the blend.
Figure 42:
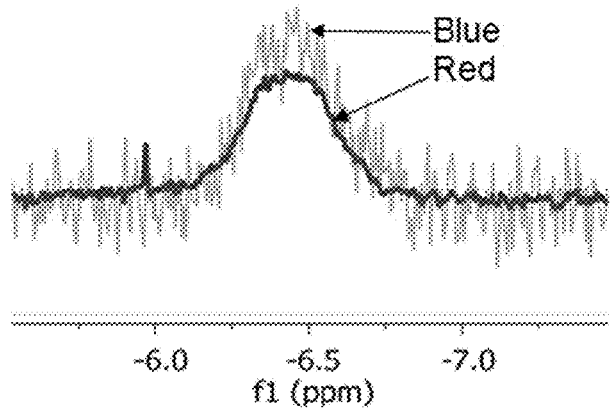
FIG. 42: provides $^{31}$P NMR overlay of the P-S-PPh$_3$ RCP (red trace) and the recovered BBCPRCP blend, demonstrating that the RCP was indeed incorporated into the film. The peak at -6.0 ppm is trace (<1%) 4-diphenylphosphinostyrene that was not observed in the BBCP film.
Figure 43:
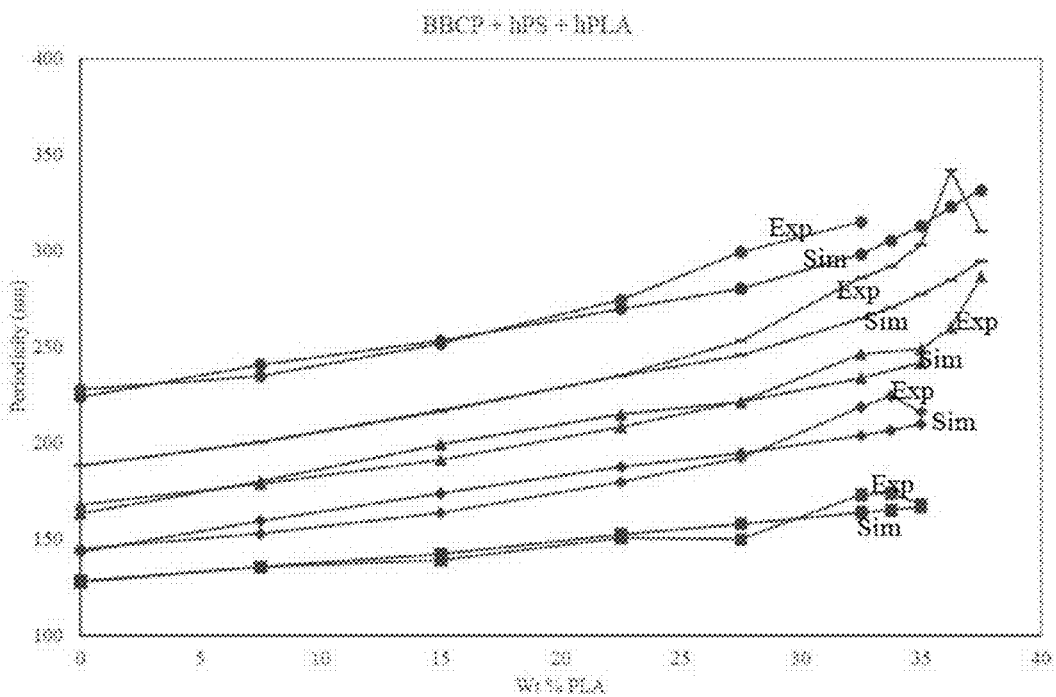
FIG. 43 shows the bulk periodicity as a function of the weight percent of homopolymer PLA (equal to weight % of homopolymer PS). Experimental measurements are depicted as blue "Exp" and simulation results are depicted as red "Sim." From the bottom up, the square, diamond, triangle, bar and circle data points represent BBCPs with MW=987 kDa, 1,410 kDa, 1,600 kDa, 1,760 kDa and 2,110 kDa, respectively.
Figure 44:
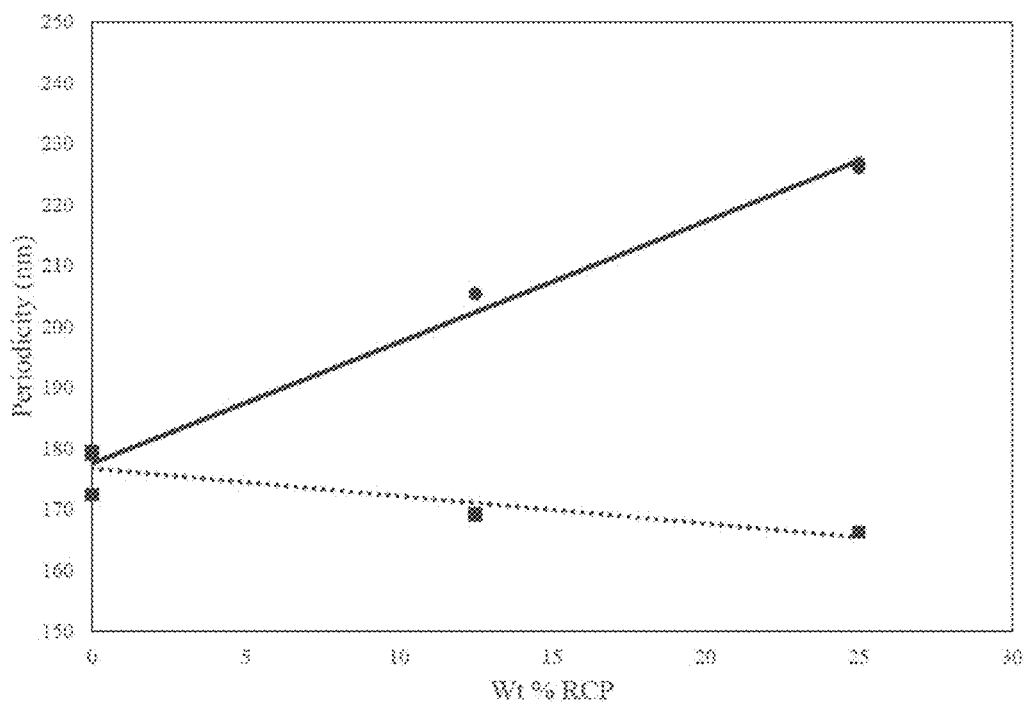
FIG. 44 shows the bulk periodicity as a function of the weight percent of random copolymer (RCP) (equal amounts of PLA-HP were also included in the simulation). Simulation results are depicted in two ways: circles with a solid line denoting a system where adding RCP increased lamellar periodicity, and squares with dashed line denoting a system where adding RCP decreased lamellar periodicity. The molecular weights of the polymers are 1,600 kDa for the BBCP, 3.1 kDa for PLA-HP and 6.0 kDa for RCPs. $\chi$ parameters for PS, PLA and RCPs are set as $\chi$PS-PLA=12.0, $\chi$PS-RCP=3.0, and $\chi$PLA-RCP=15.0 for the system with increasing lamellar spacing and $\chi$PLA-RCP=9.0 for the system with decreased lamellar spacing.
Figure 45:
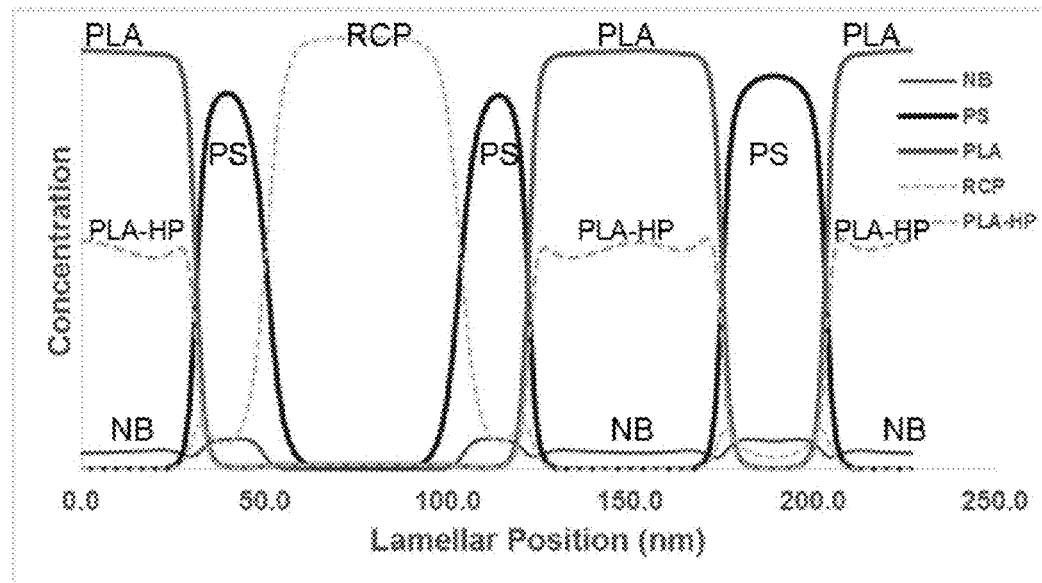
FIG. 45 shows the locations of BBCP, RCP, and PLA-HP for a system where $\chi$PS-PLA=12.0, $\chi$PS-RCP=3.0, and $\chi$PLA-RCP=15.0, and relative weight percents are 50% BBCP, 25% RCP, and 25% PLA-HP.
Figure 46:
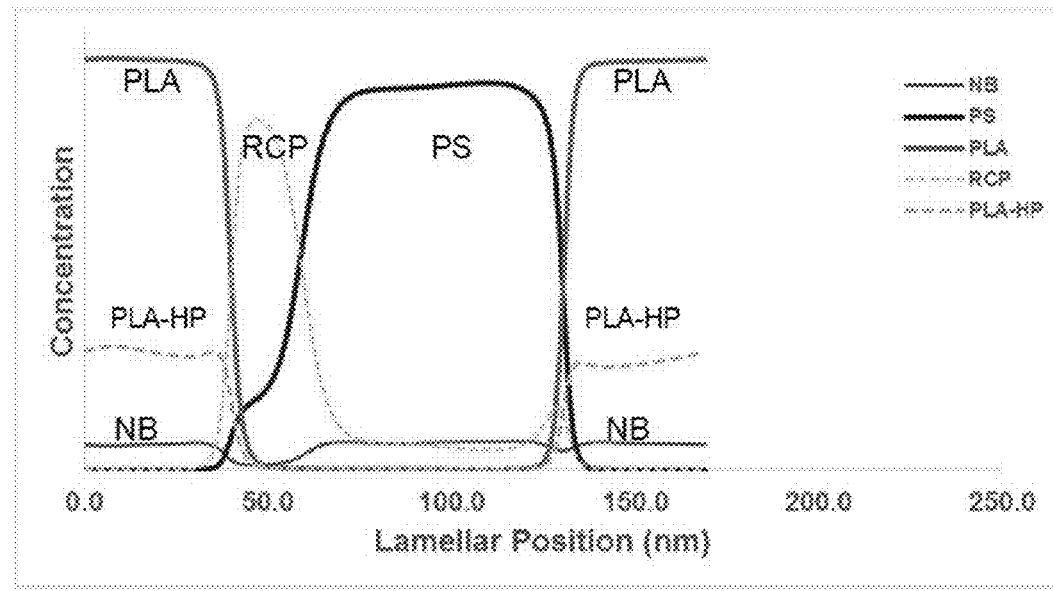
FIG. 46 shows the locations of BBCP, RCP, and PLA-HP for a system where $\chi$PS-PLA=12.0, $\chi$PS-RCP=3.0, and $\chi$PLA-RCP=9.0, and relative weight percents are 75% BBCP, 12.5% RCP, and 12.5% PLA-HP.
Figure 47:
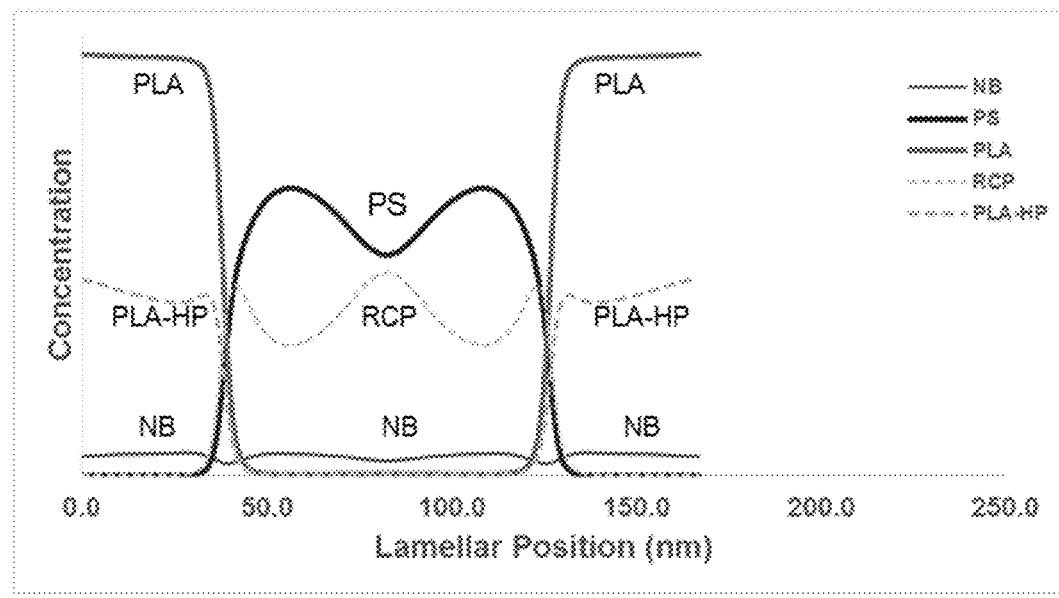
FIG. 47 shows the locations of BBCP, RCP, and PLA-HP for a system where $\chi$PS-PLA=12.0, $\chi$PS-RCP=1.0, and $\chi$PLA-RCP=9.0, and relative weight percents are 75% BBCP, 12.5% RCP, and 12.5% PLA-HP.

Example 2.2.4. IR Spectra of BBCP-RCP Blends are shown in FIG. 35.

Example 2.2.5. NMR Data of BBCP-RCP Blends: Because IR data was not able to definitively show evidence of the functional groups in all polymer films, the BBCPs were redissolved in CDCl$_3$ and analyzed either with $_1$H NMR to show evidence of the peaks geminal to the functional group on the random copolymers, or with $^{31}$P NMR in the case of phosphine containing RCP. In most cases, these peaks were highly diagnostic of the presence of the additional functional group. In one instance (the amine-functionalized RCP), the signal corresponding to this functional group was readily present in the RCP $^1$H NMR spectrum, but not observed in the recovered sample, either due to low concentration or due to hydrogen bonding causing a shift of the weak signal to a position obscured by other peaks in the spectrum. Nevertheless, because the shift in this $^1$H NMR peak relative to the starting material (the azide-functionalized RCP) was readily apparent, and because the amine-functionalized RCP caused a significant shift in the photonic band gap when incorporated into the BBCP, it is still reasonable to conclude that it is present in the BBCP array.

NMR data for the various compositions are provided in FIGS. 36 to 42.

Example 2.2.6. Additional SCFT Simulation Data are provided in FIG. 43 through FIG. 47.

Example 2.2.7. Modeled UV-Vis Data: The overall reflectance of a polymer film can be characterized by three metrics: the position of the band gap, the relative width of the band gap, and the absolute amount of reflectance in the film. Each of these variables is affected by the domain spacing of the lamellae, the number of repeating layers, and the degree of ordering in the film. As such, although the general quality of different films can be compared against one another using solely their reflectance properties (in the manner indicated in the main text), it is helpful to examine these properties more rigorously by modeling the optical properties of different films.

Figure 48:
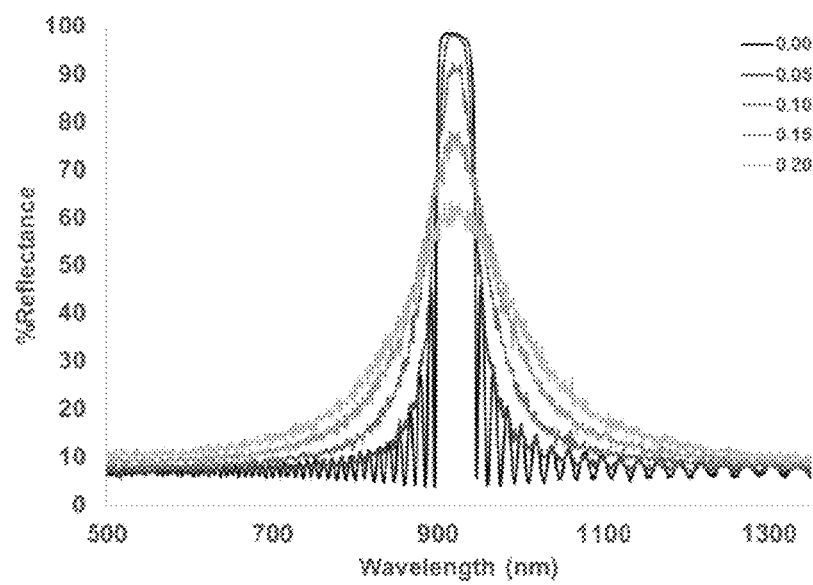
FIG. 48 shows modeled film reflectivities demonstrating that as the amount of disorder in the film increases (simulated as an increasing coefficient of variation in lamellar thickness), the reflectance peak broadens and the amount of reflectivity decreases.
Figure 49:
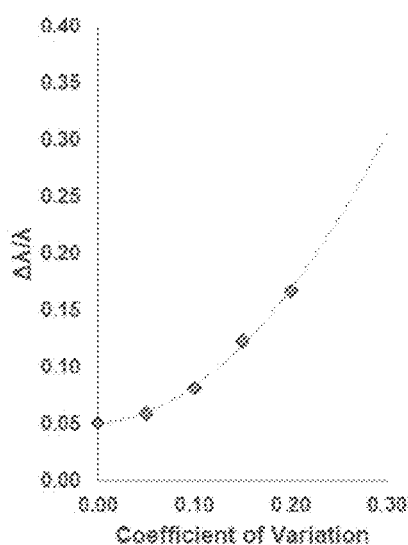
FIG. 49 shows a plot of photonic band gap FWHM as a function of disorder in the films in FIG. 48, with a trendline as a guide for the eye.
Figure 50:
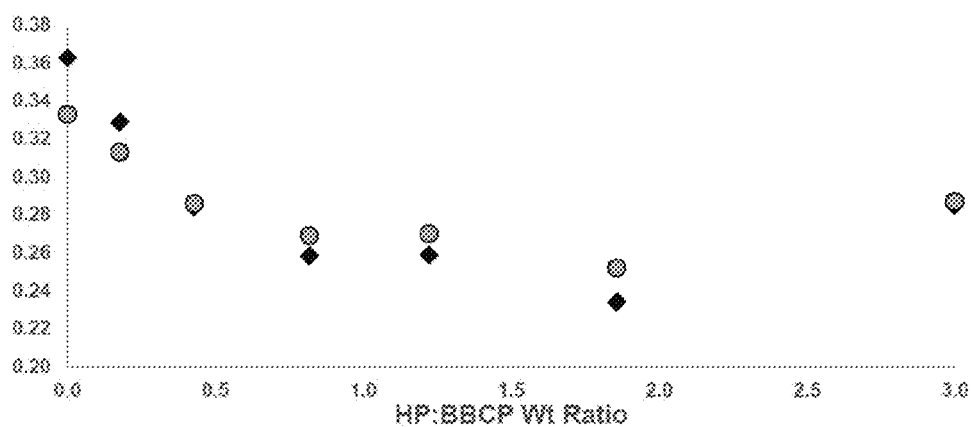
FIG. 50 shows a comparison of experimental FWHM and the amount of variation in lamellar thickness needed to simulate the amount of disorder observed in the sample. Black diamonds are experimental FWHM values for BBCP G blends (y axis is $\Delta\lambda/\lambda$). Grey circles are the corresponding coefficient of variation in lamellar thickness needed to match the FWHM in the simulated data (y axis is the coefficient of variation). This data demonstrates that the FWHM narrowing in the experimental data is indeed an indication of improvement in BBCP film quality.

Transfer Matrix Method modeling techniques were used to determine how the optical properties of the BBCP blend films varied with varying degrees of disorder within the film, using the resulting FWHM of the modeled films as an indication of their quality. Basic methods of these modeling techniques and code can be found in reference (1). In short, the amount of disorder was simulated by varying the domain spacing of the layers within a film by a given coefficient of variation as a means of simulating imperfect films. As the coefficient of variation increased, the photonic band gap broadened and the amount of reflectivity of the film decreased. By modifying the simulations such that the film reflectivity and photonic band gap FWHM matched the experimental data, we could determine how adding homopolymers to the films affected the overall film ordering in a semi-quantitative manner. See FIGS. 48 through FIG. 50.

Example 2.2.9. SAXS Data and Relative Lamellar Thickness: Because the photonic properties (band gap position and relative intensities and widths of band gap peaks) are dependent upon the relative thicknesses of the PS and PLA layers within an array, it is important to determine whether the layers are completely equal in width, or if there is any asymmetry in the layer thicknesses. Although the SEM data appear to show that the layers are asymmetric, these films were highly processed post assembly in order to obtain the SEM images, and it is not clear if these processing methods affected the relative thickness of the lamellae. Therefore, a more informative approach would be to examine the layer thickness in situ using SAXS.

Figure 51:
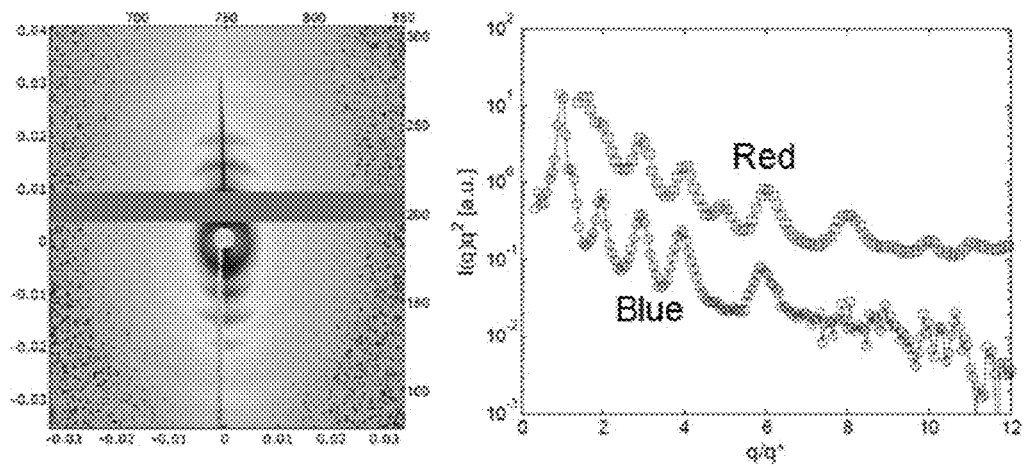
FIG. 51. Left: 2D SAXS image for BBCP A, 0 wt % HP. The lamellar peaks are developed along the vertical (z) direction, indicating that lamellae are parallel to substrate. Right: Vertical line scan data for BBCP A, 0 wt % HP (blue) and BBCP A, 70 wt % HP (Red). Note that the first order peak in the 70 wt % sample is unobservable due to it being outside of the observable q range. 1D SAXS data are plotted as scattering intensity versus normalized scattering vector q (data are normalized to the position of the first order scattering peak).
Figure 52:
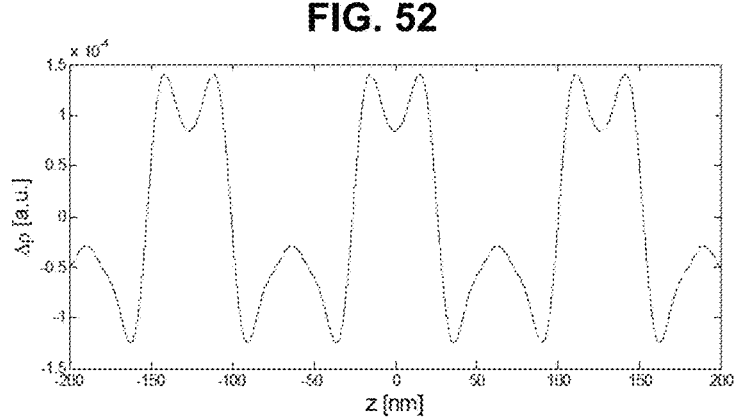
FIG. 52 shows Fourier synthesis results for the BBCP A 0 wt % sample. The x axis is the relative lamellar position and the y axis is the relative electron density. The period obtained from this result is ~130 nm, with relative block thicknesses of ~80 nm and ~50 nm, which is approximately a 3:2 ratio. Six diffraction peaks were resolved from the SAXS data resolved and the signs of the peaks are [1, 1, −1, −1, 1, 1] for this result.
Figure 53:
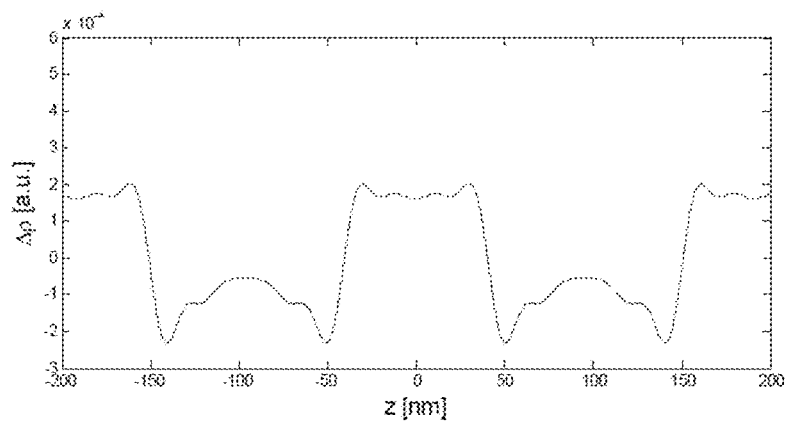
FIG. 53 shows Fourier synthesis results for the BBCP A 70 wt % sample. The x axis is the relative lamellar position and the y axis is the relative electron density. The period obtained from this result is ~190 nm, with relative block thicknesses of ~110nm and ~80nm, or approximately a 3:2 ratio. Ten diffraction peaks were resolved from the data and the signs of the peaks are [1, 1, −1, −1, 1, 1, 1, −1, −1, 1] for this result.

To determine relative thicknesses, we scanned the samples with SAXS, then performed a Fourier synthesis transformation to determine if there was any asymmetry in the layer widths. From these data (FIGS. 51-53), it was possible to determine that the layer thicknesses are not completely symmetric, but exhibit a thickness ratio of ~3:2. This allows us to explain why the second harmonic peak is visible in samples with large degrees of ordering (FIGS. 3B, 7-11), despite the fact that this peak would be unobservable in completely symmetric lamellar arrays with low refractive index contrast between layers.

Figure 54:
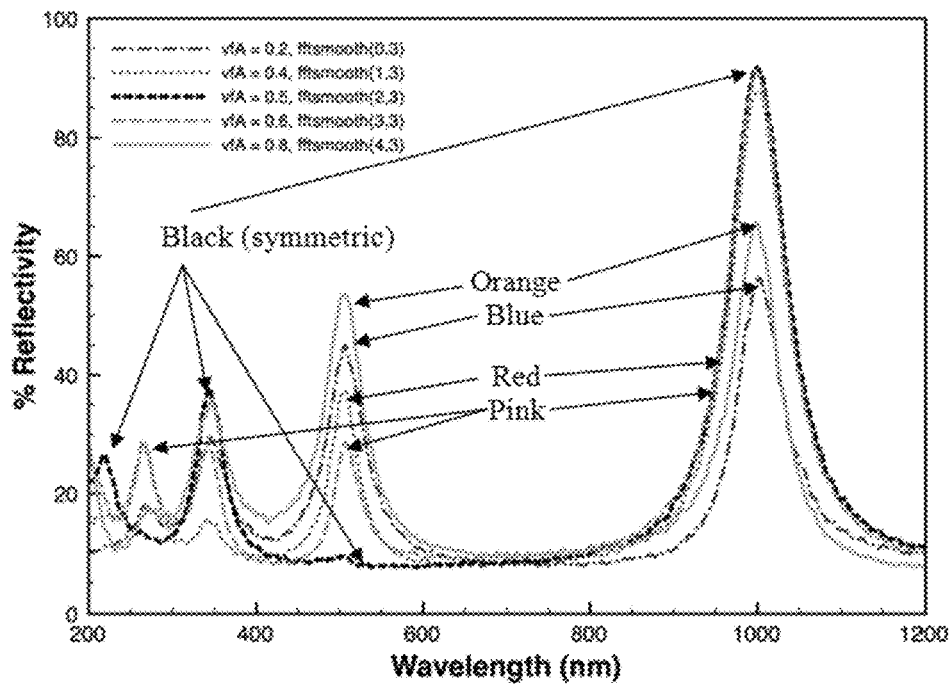
FIG. 54 shows modeled UV-Vis data as a function of relative layer thicknesses. In the perfectly symmetric case (black trace), the second order peak (~500 nm) is not observed, but this peak reappears when the layers are made asymmetric. The relative intensities of the peaks observed in the experimental data are more in line with layers that are slightly asymmetric (red, pink traces), rather than highly asymmetric (orange, blue traces), as in the highly asymmetric traces, the second order peak (~500 nm) is of almost equal intensity to the first order peak (~1000 nm). This is in contrast to the experimental results (FIGS. 3B, 7-11), where the second order peaks are always of much lower intensity than the first order peaks

To further probe the effects of asymmetry on the photonic properties of the lamellar arrays, reflection data were simulated as a function of a varied volume fraction between the PS and PLA blocks (FIG. 54). For these data, the absolute periodicity was fixed, but the relative volume fractions of PS and PLA were varied. While in the perfectly 50:50 case, the second order peak was not observable, this peak reappeared even at low asymmetry (i.e. 40:60 or 60:40). The data clearly showed that increasing asymmetry results in an increasing amplitude of the second order peak relative to first order peak intensity. These data were further indicative that the relative layer thicknesses in the film were ~3:2 as opposed to 1:1, where the second order peak would not be observed, or highly asymmetric where the second order peak would be much more intense than is observed in the experimental data.

Additionally, a comparison of the peak position as a function of relative layer thickness for films with 50:50 PLA-PS volume fractions and 60:40 PLA-PS volume fractions showed that the experimental data were in close agreement with both simulations (Table 6). However, samples with larger incorporation of homopolymers showed greater discrepancy between experiment and simulation; differences in the refractive indices of the homopolymers versus the refractive indices of the brushes on the brush block copolymer could be a contributing factor to this discrepancy. Nevertheless, all simulations predict the peak of reflection within 15%, which further confirmed that the simulated and experimental optical data were in good agreement with one another.

(5) Patel, D. M.; Frederickson, G. H. *Phys. Rev. E.,* 2003, 051802.
(6) Zalusky, A. S.; Olayo-Valles, R.; Wolf, J. H.; Hillmyer, M. A.; *J. Am. Chem. Soc.,* 2002, 124, 12761.
(7) Roe, R. J., *Methods of X-ray and Neutron scattering in polymer science*, Oxford University Press: New York, N.Y., 2000.
(8) Joannopoulos, J. D.; Johnson, S. G.; Winn, J. N.; Meade, R. D. *Photonic Crystals: Molding the Flow of Light;* 2 ed.; Princeton University Press: Princeton, N.J., 2008.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

The file of this patent or application contains at least one drawing/photograph executed in color. Copies of this patent or patent application publication with color drawing(s)/photograph(s) will be provided by the Office upon request and payment of the necessary fee.

TABLE 6

Calculated photonic band gap positions as a function of layer asymmetry. The experimentally derived lamellar spacing (as determined by SAXS) and measured photonic band gap position are compared against simulated data with perfectly symmetric layer thicknesses and layers that have a 60:40 PLA:PS volume fraction. The % difference values show the deviation between the simulated data and the experimental results.

| BBCP ID | Wt % HP | Lamellar Period (nm) | Measured $\lambda_{Max}$ (nm) | 50:50 Simulated $\lambda_{Max}$ (nm) | % Difference | 60:40 Simulated $\lambda_{Max}$ (nm) | % Difference |
|---|---|---|---|---|---|---|---|
| BBCP A | 0 | 128 | 391 | 393 | 0.51 | 392 | 0.26 |
| BBCP A | 15 | 134 | 413 | 412 | -0.24 | 410 | -0.73 |
| BBCP A | 30 | 141 | 424 | 433 | 2.12 | 430 | 1.42 |
| BBCP A | 45 | 156 | 459 | 478 | 4.14 | 474 | 3.27 |
| BBCP A | 55 | 171 | 457 | 522 | 14.22 | 518 | 13.35 |
| BBCP A | 65 | 188 | 528 | 572 | 8.33 | 569 | 7.77 |
| BBCP A | 67.5 | 197 | 530 | 599 | 13.02 | 595 | 12.26 |

The following references may be helpful in understanding some aspects of the present invention.

(1) Sveinbjornsson, B. R.; Weitekamp, R. A.; Miyake, G. M.; Xia, Y.; Atwater, H. A.; Grubbs, R. H. *Proc. Natl. Acad. Sci. U. S. A.* 2012, 109, 14332.
(2) Maher, M. J.; Bates, C. M.; Blachut, G.; Sirard, S.; Self, J. L.; Carlson, M. C.; Dean, L. M.; Cushen, J. D.; Durand, W. J.; Hayes, C. O.; Ellison, C. J.; Wilson, C. G. *Chem. Mater.* 2014, 26, 1471.
(3) Xia, Y.; Kornfield, J. A.; Grubbs, R. H. *Macromolecules* 2009, 42, 3761.
(4) Wallace, K. J.; Hanes, R.; Anslyn, E.; Morey, J.; Kilway, K. V.; Siegeld, J. Synthesis 2005, 12, 2080-2083.

What is claimed:

1. A composition comprising:
(a) a brush block copolymer comprising a backbone and pendant polymer arms,
(i) the brush block copolymer having an overall weight averaged molecular weight in a range of from about 800 kDa to about 5000 kDa, and having a polydispersity index (PDI) in a range of from about 1 to about 1.2;
(ii) the block copolymer comprising a first and a second block copolymer moiety, the first block copolymer moiety comprising a first pendant polymer arm and the second block copolymer moiety comprising a second pendant polymer arm, the first and the second block copolymer moieties being present in a ratio of molecular weights in a range of from about 56:44 to about 44:56;

(iii) the first and the second pendant polymer arms each comprising different repeating monomer units, each arm independently having a degree of polymerization (DP) in a range of from about 20 to about 200 and a polydispersity index in range of from about 1 to about 1.2;

(b) a first linear polymer having a weight averaged molecular weight in a range of from about 1 kDa to about 20 kDa and comprising the same repeating monomer units as present in the first pendant polymer arm;

(c) a second linear polymer having a weight averaged molecular weight in a range of from about 1 kDa to about 20 kDa and comprising the same repeating monomer units as present in the second pendant polymer arm, wherein the repeating monomer units in the first and the second polymers are independently optionally functionalized with an alkoxy, alkoxycarboxy, alkyl, amino, aryl, azido, carboxylato, cyano, halo, hydroxy, hydroxycarboxy, nitro, phosphino, or thiol;

wherein the first and the second polymers are present, with respect to each other, in a weight ratio of from about 56:44 to about 44:56; and wherein the first and the second polymers are together present, with respect to the brush block copolymer, in a weight ratio of from about 2:98 to about 80:20.

2. The composition of claim 1, wherein the backbone of the brush block copolymer comprises optionally substituted alkylene, alkenylene, or both alkylene or alkenylene linkages.

3. The composition of claim 1, wherein the backbone of the brush block copolymer is derived from an enyne, diyne, or ring-opening metathesis polymerization (ROMP) reaction.

4. The composition of claim 1, wherein the backbone of the brush block copolymer comprises an optionally substituted polynorbornene.

5. The composition of claim 1, wherein the first and the second polymer arms independently contains alkylene, alkenylene, amido, carbonate, ester, ether, urethane repeating units, or a combination thereof.

6. The composition of claim 1, wherein the first polymer contains the same repeating monomer units as present in the first pendant polymer arm.

7. The composition of claim 1, wherein the first polymer contains a functionalized derivative of the same repeating monomer units as present in the first pendant polymer arm.

8. The composition of claim 7, wherein the functionalization comprises the incorporation of an alkoxy, alkoxycarboxy, alkyl, amino, aryl, azido, carboxylato, cyano, halo, hydroxy, hydroxycarboxy, nitro, phosphino, or thiol.

9. The composition of claim 1, wherein the second polymer contains the same repeating monomer units as present in the second pendant polymer arm.

10. The composition of claim 1, wherein the second polymer contains a functionalized derivative of the same repeating monomer units as present in the second pendant polymer arm.

11. The composition of claim 10, wherein the functionalization comprises the incorporation of an alkoxy, alkoxycarboxy, alkyl, amino, aryl, azido, carboxylato, cyano, halo, hydroxy, hydroxycarboxy, nitro, phosphino, or thiol.

12. The composition of claim 1, wherein the first or the second polymer arm comprises a polystyrene.

13. The composition of claim 1, wherein the first or the second polymer comprises a functionalized polystyrene.

14. The composition of claim 1, wherein the brush block copolymer, in the absence of the first and the second polymer, exhibits a lamellar periodicity in a range of from about 10 nm to about 500 nm.

15. The composition of claim 1, wherein the brush block copolymer, in the presence of the first and the second polymer, exhibits a lamellar periodicity in a range of from about 60 nm to about 600 nm.

16. The composition of claim 1, wherein the composition exhibits a photonic band gap (reflection maximum) at a wavelength in a range of from about 200 nm to about 1750 nm.

17. The composition of claim 1, wherein the composition transmits at least about 30% of incident light over a series of wavelengths in the range from about 350 nm to about 600 nm.

18. An infrared reflective coating comprising a composition of claim 1.

19. A waveguide comprising a composition of claim 1.

20. A method preparing a composition of claim 1, the method comprising incorporating the first and the second polymer into the structure of the brush block copolymer.

21. The method of claim 20, wherein (a) the brush block copolymer has an overall weight averaged molecular weight in a range of from about 800 kDa to about 3000 kDa and a polydispersity index (PDI) in a range of from about 1 to about 1.04;

(b) the first and the second block copolymer moieties are present in a ratio of molecular weights in a range of from about 52:48 to about 48:52;

(c) the first and the second pendant polymer arms each independently have a polydispersity index in range of from about 1 to about 1.04;

(d) the first linear polymer has a weight averaged molecular weight in a range of from about 3 kDa to about 14 kDa and comprises the same repeating monomer units as present in the first pendant polymer arm; and (e) the second linear polymer has a weight averaged molecular weight in a range of from about 3 kDa to about 14 kDa and comprises the same repeating monomer units as present in the second pendant polymer arm, wherein the repeating monomer units in the first and the second polymers are independently optionally functionalized with an alkoxy, alkoxycarboxy, alkyl, amino, aryl, azido, carboxylato, cyano, halo, hydroxy, hydroxycarboxy, nitro, phosphino, or thiol.

22. The method of claim 20, further comprising crosslinking the composition.

23. The method of claim 20 further comprising subjecting the composition of claim 1 to an electromagnetic field to provide an aligned lamellar structure within the composition.

* * * * *